US011816941B2

(12) United States Patent
Wilkins et al.

(10) Patent No.: US 11,816,941 B2
(45) Date of Patent: Nov. 14, 2023

(54) SECURE STORAGE CONTAINER, SYSTEM FOR SECURE STORAGE, AND METHOD FOR USING A SECURE STORAGE CONTAINER

(71) Applicant: Keep Labs Inc., Waterloo (CA)

(72) Inventors: Philip P. Wilkins, Waterloo (CA); Sepehr Seyedi, Toronto (CA); Benjamin M. Gliksman, Waterloo (CA); Joel Christopher Robertson Scott, Toronto (CA)

(73) Assignee: Keep Labs Inc., Waterloo (CA)

( * ) Notice: Subject to any disclaimer, the term of this patent is extended or adjusted under 35 U.S.C. 154(b) by 365 days.

(21) Appl. No.: 17/060,977

(22) Filed: Oct. 1, 2020

(65) Prior Publication Data

US 2021/0097791 A1  Apr. 1, 2021

Related U.S. Application Data

(60) Provisional application No. 62/908,887, filed on Oct. 1, 2019.

(51) Int. Cl.
*G16H 20/10* (2018.01)
*G07C 9/00* (2020.01)
(Continued)

(52) U.S. Cl.
CPC ...... *G07C 9/00309* (2013.01); *H04W 12/009* (2019.01); *H04W 12/06* (2013.01);
(Continued)

(58) Field of Classification Search
CPC ........... B60C 9/00; B60C 5/005; A62C 3/002; A62C 3/07; A62C 3/08; A62C 3/10;
(Continued)

(56) References Cited

U.S. PATENT DOCUMENTS

| D787,895 S | 5/2017 | Kilduff et al. |
| D807,197 S | 1/2018 | Kilduff et al. |

(Continued)

FOREIGN PATENT DOCUMENTS

| CA | 174082 S | 7/2018 |
| CA | 174702 S | 7/2018 |

(Continued)

*Primary Examiner* — Dionne Pendleton
(74) *Attorney, Agent, or Firm* — BERESKIN & PARR LLP/S.E.N.C.R.L. s.r.l; Isis E. Caulder; Paul Blizzard

(57) ABSTRACT

Improved methods, systems, apparatuses, and components for secure storage of products, including an improved secure storage container and system. The secure storage container may provide a user with secure, organized, and substantially airtight storage of products. The secure storage system may allow for the authentication of the user to lock/unlock the secure storage container. The secure storage system may further collect data obtained from sensors. The data may include, but is not limited to, lock/unlocking event information, weight changes of the stored substances, movement of the substances within the box, temperature sensor data, humidity sensor data. The secure storage system may provide for actively maintaining a particular humidity or temperature point using a control system.

18 Claims, 25 Drawing Sheets

(51) Int. Cl.
*H04W 12/00* (2021.01)
*H04W 12/06* (2021.01)

(52) U.S. Cl.
CPC ............. *G07C 2009/00507* (2013.01); *G07C 2009/00769* (2013.01)

(58) Field of Classification Search
CPC ........... A62C 3/16; A62C 31/22; A62C 37/04; A62C 37/40; A62C 37/44; B60Q 9/00; B60Q 5/005; B60Y 2200/14; B60Y 2200/30; B60Y 2200/50; B64D 25/00; B64D 45/00; B64D 9/00; B64D 9/003; B65D 2203/10; B65D 25/02; B65D 2590/0083; B65D 90/06; B65D 90/22; B65D 90/48; B65G 2201/0235; B65G 2203/0216; B65G 1/1373; B65G 67/24; B65G 31/04; B65G 5/06; B65G 15/22; B65G 15/24; B65G 25/20; B65G 21/086; B65G 25/14; B65G 55/14; B65G 1/225; B65G 11/10; B65G 11/184; B65G 11/186; B65G 21/0201; B65G 21/0209; B65G 2203/06; B65G 2203/10; B65G 2211/00; B65G 2313/00; B65G 2313/02; B65G 25/28; B65G 25/2808; B65G 25/2844; B65G 2543/00101; B65G 2543/00527; B65G 2543/00537; B65G 33/1658; B65G 43/168; B65G 5/24; B65G 5/6626; B65G 81/2053; B65G 81/3848; B65G 88/524; B65G 90/023; B65G 90/08; B65G 90/18; G01C 5/06; G01C 21/3438; G01J 5/0014; G01J 5/0066; G01J 5/025; G01J 5/48; G01K 3/005; G01K 3/10; G01N 33/004; G01N 33/0075; G01T 1/17; G06K 19/0702; G06K 19/0717; G06K 19/07758; G06K 19/07766; G06Q 10/0832; G06Q 10/0833; G06Q 10/087; G06Q 10/0836; G06Q 10/083; G06Q 10/0837; G06Q 10/0838; G06Q 10/0875; G06Q 30/0633; G06Q 50/28; H04W 12/009; H04W 12/06; H04W 12/10; H04W 12/108; H04W 24/08; H04W 4/021; H04W 4/35; H04W 4/38; H04W 8/005; H04W 84/18; H04W 88/18; H04W 4/80; H04W 52/322; H04W 84/20; H04Q 2209/40; H04Q 2209/823; H04Q 2209/826; H04Q 9/00; H04Q 9/02; H04L 41/04; H04L 41/06; H04L 67/04; H04L 67/12; H04L 67/52; H04L 67/53; H04L 69/28; G08B 17/06; G08B 17/10; G08B 19/00; G08B 21/182; G08B 23/00; G08B 25/001; G08B 25/009; G08B 25/10; H02J 7/00036; H02J 7/0047; H02J 9/00; G07C 2009/00412; G07C 2009/00507; G07C 2009/00769; G07C 2009/00793; G07C 9/00309; G07C 9/00571; G07C 9/00896; G07C 9/00912; G07C 9/00563; G07C 9/00857; G07C 9/27; G07C 1/10; G07C 1/32; G07C 2009/00349; G07C 2009/00634; G07C 2009/00841; G07C 2009/0088; G07C 2009/0092; G07C 2209/08; G07C 2209/62; G07C 9/00182; G07C 9/00817; G07C 9/00944; G07C 9/21; G07C 9/22; G07C 9/253; G07C 9/29; G07C 9/37; Y02W 30/80; H04N 23/00; H04N 23/661; H04B 1/3822; G16H 40/20; G16H 40/67; G08G 1/202; G07F 11/62; G07F 17/12; G07F 21/31; G07F 21/32; G05B 2219/39172; G05B 2219/50391; B60W 10/04; B60W 10/20; B60W 2554/00; B60W 30/09; B60P 3/007; B60G 17/0152; B60G 2300/02; B60G 2400/252; B60G 2500/30; B60G 2800/019; A47F 10/02; A47F 2010/005; B25J 19/02; B25J 5/007; B25J 9/08; B25J 9/162; B25J 9/163; B25J 9/1666; B25J 9/1679; A47C 11/00; A47C 7/628; A47B 47/0091; A47B 71/00; A47B 81/00; A47B 87/008; A47B 88/941; A47B 88/944; G05D 1/0011; G05D 1/0022; G05D 1/0088; G05D 1/021; G05D 1/0214; G05D 1/0223; G05D 1/0225; G05D 1/027; G05D 1/0274; G05D 1/0276; G05D 1/0282; G05D 1/0287; G05D 1/0291; G05D 1/0295; G05D 2201/0206; G05D 2201/0211; G05D 2201/0216; E05G 1/08; E05G 1/024; A47G 29/141; A47G 29/20; A47G 2029/144; A47G 2029/145; A47G 2029/149; A47G 2029/146; A47G 2029/1257; A47G 2029/147; A47G 29/124; A47G 29/22; A47G 2029/142; A47G 29/1225; A47G 29/126

See application file for complete search history.

(56) References Cited

U.S. PATENT DOCUMENTS

| | | | |
|---|---|---|---|
| 10,039,401 B1 * | 8/2018 | Romanucci | A47G 29/141 |
| D842,700 S | 3/2019 | Blomberg et al. | |
| D843,225 S | 3/2019 | Kilduff et al. | |
| D848,832 S | 5/2019 | Blomberg et al. | |
| D858,276 S | 9/2019 | Blomberg et al. | |
| 10,751,259 B1 * | 8/2020 | Dutta | A61J 7/0472 |
| 10,872,482 B1 * | 12/2020 | Colton | B65D 55/14 |
| 10,968,012 B1 * | 4/2021 | Ward | B65D 11/1833 |
| 11,392,885 B1 * | 7/2022 | Leung | G06Q 10/0832 |
| 11,581,099 B1 * | 2/2023 | Rufo | G16H 10/65 |
| 2016/0058181 A1 * | 3/2016 | Han | A47B 81/00 |
| | | | 312/236 |
| 2017/0355511 A1 | 12/2017 | Akdogan et al. | |
| 2019/0241322 A1 | 8/2019 | Blomberg et al. | |
| 2019/0313828 A1 * | 10/2019 | Schmider | G07C 9/21 |
| 2020/0239207 A1 | 7/2020 | Bontempo et al. | |
| 2021/0104108 A1 * | 4/2021 | Cartwright | G07C 9/00563 |
| 2021/0198009 A1 * | 7/2021 | Heinz | B65D 11/10 |
| 2021/0298505 A1 * | 9/2021 | Quastad | A47G 29/22 |
| 2021/0298507 A1 * | 9/2021 | Grijalva | A47G 29/141 |
| 2022/0061573 A1 * | 3/2022 | Jertberg | A47G 29/20 |
| 2022/0084341 A1 * | 3/2022 | Stötter | G07C 9/00857 |
| 2022/0257041 A1 * | 8/2022 | Redford | B65D 11/186 |
| 2023/0147994 A1 * | 5/2023 | Mercolino | A61J 7/0076 |
| | | | 700/240 |

FOREIGN PATENT DOCUMENTS

| | | |
|---|---|---|
| CA | 179431 S | 7/2018 |
| CA | 177837 S | 12/2018 |
| CA | 184505 S | 12/2018 |
| CA | 184506 S | 12/2018 |
| CA | 184507 S | 12/2018 |
| CA | 184508 S | 12/2018 |
| CA | 184509 S | 12/2018 |
| CN | 304339492 S | 11/2017 |
| CN | 304339937 S | 11/2017 |
| CN | 304481096 S | 1/2018 |

(56) References Cited

FOREIGN PATENT DOCUMENTS

| CN | 304533541 S | 3/2018 |
|---|---|---|
| CN | 107914938 A | 4/2018 |
| CN | 207434024 U | 6/2018 |
| CN | 305016728 S | 1/2019 |
| CN | 305025998 S | 2/2019 |
| WO | 2018/067894 A9 | 4/2018 |
| WO | 2019/099746 A1 | 5/2019 |

* cited by examiner

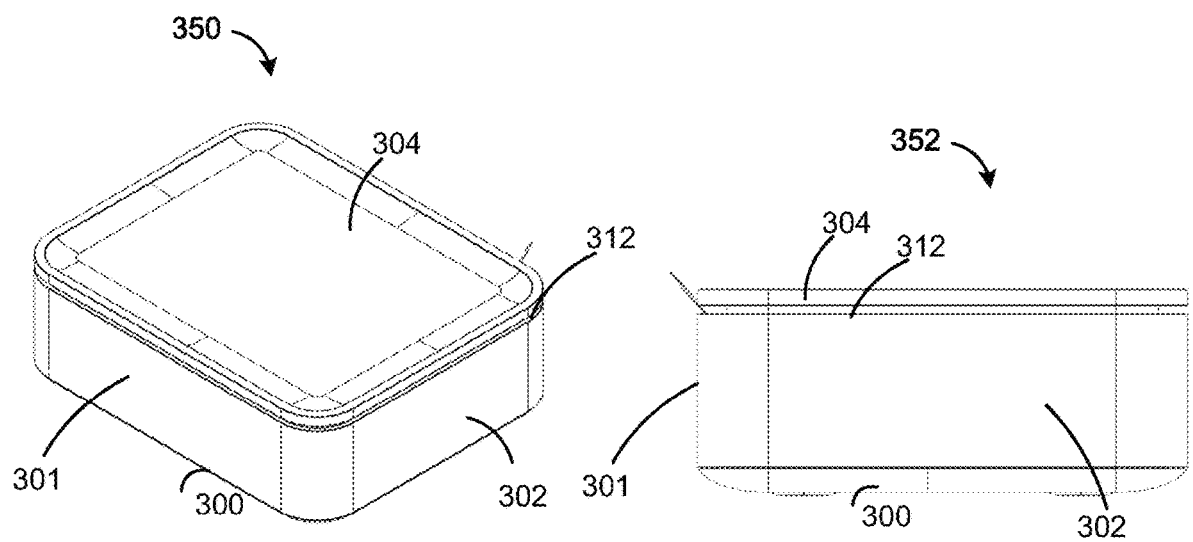
FIG. 3A
FIG. 3B
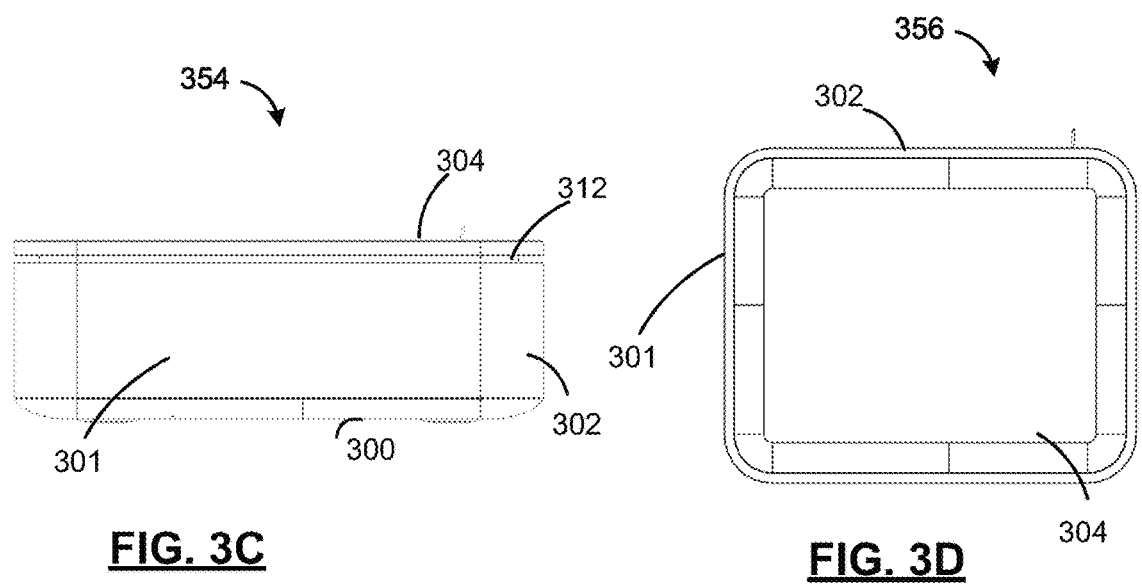
FIG. 3C
FIG. 3D

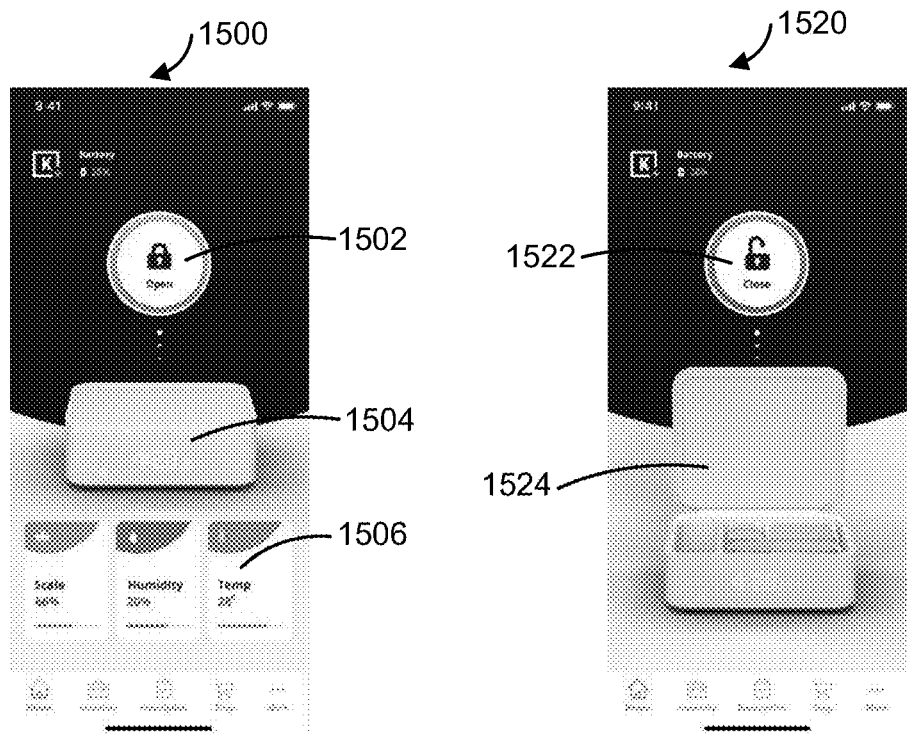
FIG. 15A
FIG. 15B
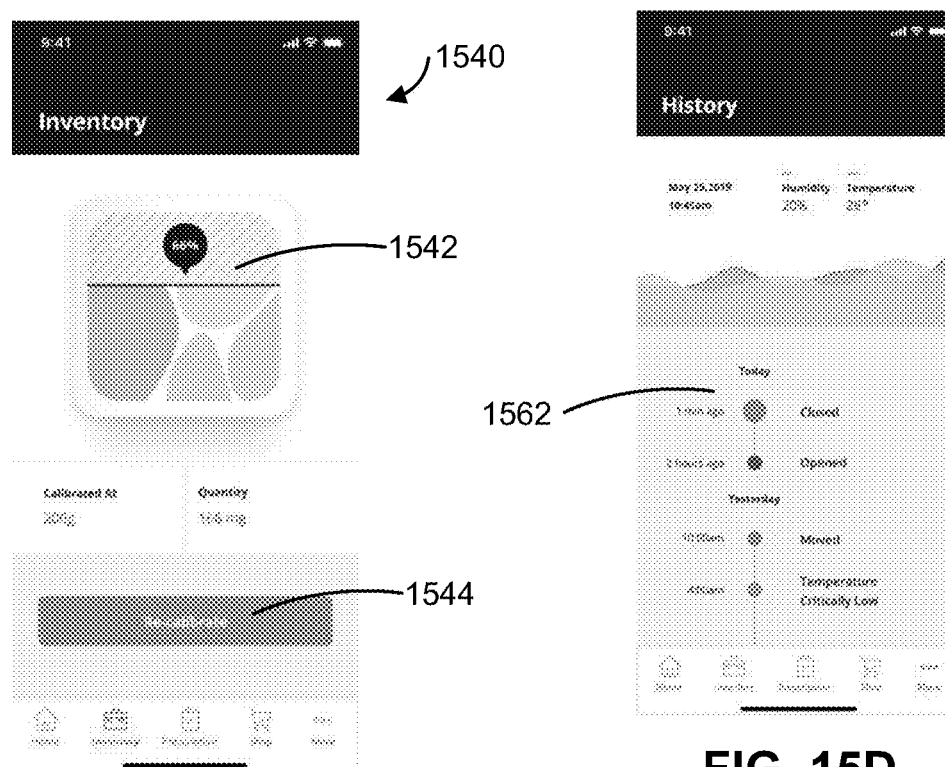
FIG. 15C
FIG. 15D

SECURE STORAGE CONTAINER, SYSTEM FOR SECURE STORAGE, AND METHOD FOR USING A SECURE STORAGE CONTAINER

CROSS-REFERENCE TO RELATED APPLICATIONS

This application claims the benefit of U.S. Provisional Patent Application Ser. No. 62/908,887 for a SECURE STORAGE CONTAINER, SYSTEM FOR SECURE STORAGE, AND METHOD FOR USING A SECURE STORAGE CONTAINER, filed on 1 Oct. 2019, which is hereby incorporated by reference in its entirety.

FIELD

The described embodiments relate to apparatuses, systems and methods for secure storage, and in particular, secure storage having a remote control by a user.

BACKGROUND

Patients often store products having a pharmacological effect. Increasingly, these products include psychoactive products such as Cannabis. These products are often provided in a variety of forms, including dried flowers, oils, edibles, capsules, creams, etc. The safe storage of these products is very important, especially where a patient shares a home with children or pets who are at risk of discovering the products and consuming them. Therefore, patients desire that such products are stored securely, in a manner by which children, pets, and other unauthorized individuals are unable to obtain access to them.

It may further be desirable to store these products in air-sealed compartments in order to maintain the shelf-life of the products, and to avoid errant odors. Presently, the secure storage of these products is cumbersome for patients because manual steps are often required in order to obtain the securely stored products, including unlocking locks or inputting passkeys.

The problem is further complicated when a patient wants to be able to track their usage of such products. In order to do so, the patients may manually track the product usage, or they may be required to access a container to visually inspect the stored product. There is a need therefore to provide improvements in the smart storage of such products and enable users to obtain data metrics relating to such products.

Finally, some products are sensitive to changes in temperature and humidity, and it is therefore desirable to collect and provide notifications of adverse conditions in a storage container.

SUMMARY

Provided herein are improved methods, systems, apparatuses, and components, including an improved secure storage container and system. The secure storage container may provide a user with secure, organized, and substantially airtight storage of products. The secure storage system may allow for the authentication of the user to lock/unlock the secure storage container. The secure storage system may further collect data obtained from sensors. The data may include, but is not limited to, locking/unlocking event information, weight changes of the stored substances, movement of the substances within the box, temperature sensor data, humidity sensor data. The secure storage system may provide for actively maintaining a particular humidity or temperature point using a control system.

The products may be stored inside the secure storage container using sub-containers. Each sub-container may be clear and plastic and may possess a near field communication (NFC) tag, or other wireless identifier, to allow the secure storage system to automatically identify its contents. In an embodiment, a visual sensor may be used to scan a product identifier of the products as they are put into the sub-containers in the secure box.

The secure storage container comprises sensors to enable data collection. The secure storage system may utilize data from weight sensors to detect changes in the weight of the contents and may prompt the user regarding the correct dosage, based upon information about the products identified using the product identifier.

The secure storage system may be in communication with an application on a mobile device to provide the user information about the products inside the box and the data from the sensors. The secure storage system may be paired with an application running on one or more mobile devices. The secure storage system may be WiFi or Bluetooth enabled to allow for the communication link to the application.

The secure storage container may possess a locking/unlocking mechanism to ensure that only an authorized user can unlock the box to access the content. To perform locking or unlocking, a mobile device in wireless communication with the secure storage system may launch the application, the user may engage a password, pin, or biometric authentication method and if the authentication is successful the application may provide an encrypted unlock code using the wireless communication to the secure storage system. The secure storage container may then actuate a positive locking mechanism that secures or unsecures the top of the secure storage container.

In a first aspect, there is provided a secure storage container, the container comprising: a base; at least one wall extending from the base defining a storage cavity; a top configured to cooperate with the at least one wall to provide a re-sealable closure for the storage cavity, the top and the at least one wall cooperating to provide a substantially airtight seal; an electronic lock, the electronic lock disposed between the top and the at least one wall, the electronic lock having an unlocked position and a locked position, the locked position providing a substantially tamper resistant securement of the top to the at least one wall; the base comprising one or more base portions, each base portion comprising a weight sensor; and one or more sub-containers, each of the one or more sub-containers comprising: a sub-container base; at least one sub-container wall extending from the sub-container base; the sub-container base sized to substantially cover one or more base portions in the regularly space arrangement of base portions.

In at least one embodiment, the one or more base portions may be arranged in a regularly spaced grid.

In at least one embodiment, an exterior of the one or more sub-containers may further comprise a grip.

In at least one embodiment, the at least one wall further may comprise three walls extending from the base defining the storage cavity, and the secure storage container may generally be a triangular prism.

In at least one embodiment, the at least one wall further may comprise four walls extending from the base defining the storage cavity, and the secure storage container may generally be a rectangular prism.

In at least one embodiment, the four walls, the top, and the base may form rounded corners.

In a second aspect, there is provided a secure storage system, the system comprising: a secure storage container, the secure storage container comprising: a base; at least one wall extending from the base defining a storage cavity; a top, the top configured to cooperate with the at least one wall to provide a re-sealable closure for the storage cavity; an electronic lock connected to the top and the least one wall, the electronic lock having an unlocked position and a locked position, the locked position providing a substantially tamper resistant securement of the top to the at least one wall; a first wireless transceiver; a processor, the processor in communication with the first wireless transceiver and the electronic lock, the processor generally configured to: receive, using the first wireless transceiver, a locking message; and activating the electronic lock from the unlocked position to the locked position in response to the locking message; a mobile application executed on a processor of a mobile device, the mobile application generally configured to: receive a first user input; transmit, from a second wireless transceiver of the mobile device to the first wireless transceiver, the locking message based on the first user input.

In at least one embodiment, the processor of the secure storage container may be further configured to: receive, using the first wireless transceiver, an unlocking message; and activating the electronic lock from the locked position to the unlocked position in response to the unlocking message; the mobile application may generally be configured to: receive a second user input; transmit, from the second wireless transceiver of the mobile device to the first wireless transceiver, the unlocking message based on the second user input.

In at least one embodiment, the mobile application may further be configured to receive an unauthorized access message from the secure storage container based on an attempt to open the secure storage container when the electronic lock is in the locked position or an attempt to move the secure storage container when the electronic lock is in the locked position, and deliver an unauthorized access notification corresponding to the unauthorized access message to a user.

In at least one embodiment, the system may further comprise: a server, the server comprising: a server processor, the server processor may be configured to: receive an unauthorized access message from the secure storage container based on an attempt to open the secure storage container when the electronic lock is in the locked position or an attempt to move the secure storage container when the electronic lock is in the locked position; and transmit an unauthorized access notification corresponding to the unauthorized access message to the user at the mobile device.

In at least one embodiment, the system may further comprise: the secure storage container may further comprise: the base further comprises a weight sensor, the weight sensor in communication with the processor of the secure storage container; the processor may be further configured to: transmit, from the first wireless transceiver to the second wireless transceiver, weight data from the weight sensor; and the mobile application may be further configured to receive, using the second wireless transceiver of the mobile device, the weight data from the weight sensor.

In at least one embodiment, the processor of the secure storage container may be further configured to: determine a weight change over a time period based on the weight data; and transmit a dosage message corresponding to the weight change to the mobile device; the mobile application may be further configured to: receive the dosage message from the secure storage container; and display a dosage notification based on the dosage message to a user at the mobile device.

In at least one embodiment, there may be a single base portion comprising substantially the entire base.

In at least one embodiment, the secure storage container may further comprise: the base comprising a regularly spaced grid arrangement of base portions, each base portion comprising a weight sensor; the processor may be further configured to: transmit, from the first wireless transceiver to the second wireless transceiver, weight data from the weight sensor of each base portion; and the mobile application may be further configured to receive, using the second wireless transceiver of the mobile device, the weight data from each base portion.

In at least one embodiment, the mobile application may be further configured to deliver a weight notification to a user based on the weight data or change in weight over a time period.

In at least one embodiment, the mobile application may store a public key of the secure storage container and the processor of the secure storage container may store a public key of the mobile application, and the processor of the mobile device and the processor of the secure storage container encrypt their communications using public-key cryptography.

In at least one embodiment, a private key of the secure storage container may be stored in a secure enclave of the processor of the secure storage container, and a private key of the mobile application may be stored in a secure enclave of the processor of the mobile device.

In at least one embodiment, the mobile application may authenticate a user identity using a user biometric.

In at least one embodiment, the mobile application may be further configured to send an access control message to a second user at a second mobile device.

In at least one embodiment, the system may further comprise: one or more sub-containers, each of the one or more sub-containers may comprise: a sub-container base; at least one sub-container wall extending from the sub-container base; the sub-container base sized to substantially cover one or more base portions in the regularly spaced arrangement of base portions.

In at least one embodiment, the system may further comprise: the secure storage container may further comprise: a local wireless transceiver; the one or more sub-containers, each further comprising a local wireless identifier, wherein the local wireless identifier is readable by the local wireless transceiver.

In a third aspect, there is provided a method for using a secure storage container, the method comprising: receiving, from a user input device of a mobile device, a pairing request from a user corresponding to the secure storage container; in response to the pairing request, pairing the mobile device with the secure storage container, by: generating at a processor of the mobile device, a private mobile key and a public mobile key; storing, in a secure enclave of the processor of the mobile device, the private mobile key; transmitting, from the mobile device to the secure storage container, the public mobile key; generating, at a processor of the secure storage container, a private container key and a public container key; storing, in a secure enclave of the processor of the secure storage container, the private container key; transmitting, from the secure storage container to the mobile device the public container key; receiving, from the user input device of the mobile device, a locking request from the user corresponding to the secure storage container;

in response to the locking request, locking the secure storage container by: sending, from the mobile device to the secure storage container, a locking message, the locking message encrypted using the public container key; receiving, at the secure storage container, the locking message, the locking message decrypted using the private container key; and upon a validation of the locking message, activating, at the secure storage container, an electronic lock from an unlocked position to a locked position.

In at least one embodiment, the method may further comprise: receiving, from the user input device of the mobile device, an unlocking request from the user corresponding to the secure storage container; in response to the unlocking request, unlocking the secure storage container by: sending, from the mobile device to the secure storage container, an unlocking message, the unlocking message encrypted using the public container key; receiving, at the secure storage container, the unlocking message, the unlocking message decrypted using the private container key; and upon a validation of the unlocking message, activating, at the secure storage container, an electronic lock from the locked position to the unlocked position.

In a fourth aspect, there is provided a method for using a secure storage container, the method comprising: receiving, from a server, a pairing request from a user corresponding to the secure storage container; in response to the pairing request, pairing the server with the secure storage container, by: generating, at a processor of the server, a private server key and a public server key; storing, in a database of the server, the private server key; transmitting, from the server to the secure storage container, the public server key; generating, at a processor of the secure storage container, a private container key and a public container key; storing, in a secure enclave of the processor of the secure storage container, the private container key; transmitting, from the secure storage container to the server, the public container key; receiving, from the server, a locking request from the user corresponding to the secure storage container; in response to the locking request, locking the secure storage container by: sending, from the server to the secure storage container, a locking message, the locking message encrypted using the public container key; receiving, at the secure storage container, the locking message, the locking message decrypted using the private container key; and upon a validation of the locking message, activating, at the secure storage container, an electronic lock from an unlocked position to a locked position.

In at least one embodiment, the method may further comprise: receiving, from the server, an unlocking request from the user corresponding to the secure storage container; in response to the unlocking request, unlocking the secure storage container by: sending, from the server to the secure storage container, an unlocking message, the unlocking message encrypted using the public container key; receiving, at the secure storage container, the unlocking message, the unlocking message decrypted using the private container key; and upon a validation of the unlocking message, activating, at the secure storage container, an electronic lock from the locked position to the unlocked position.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from the detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and the figures will now be briefly described.

FIG. 3A is a perspective view of a closed secure storage container.
FIG. 3B is a side view of a closed secure storage container.
FIG. 3C is a front view of a closed secure storage container.
FIG. 3D is a top view of a closed secure storage container.

FIG. 15A is a mobile application displaying a locked user interface.

FIG. 15B is a mobile application displaying an unlocked user interface.

FIG. 15C is a mobile application displaying an inventory user interface.

FIG. 15D is a mobile application displaying a history user interface.

Figure 1:
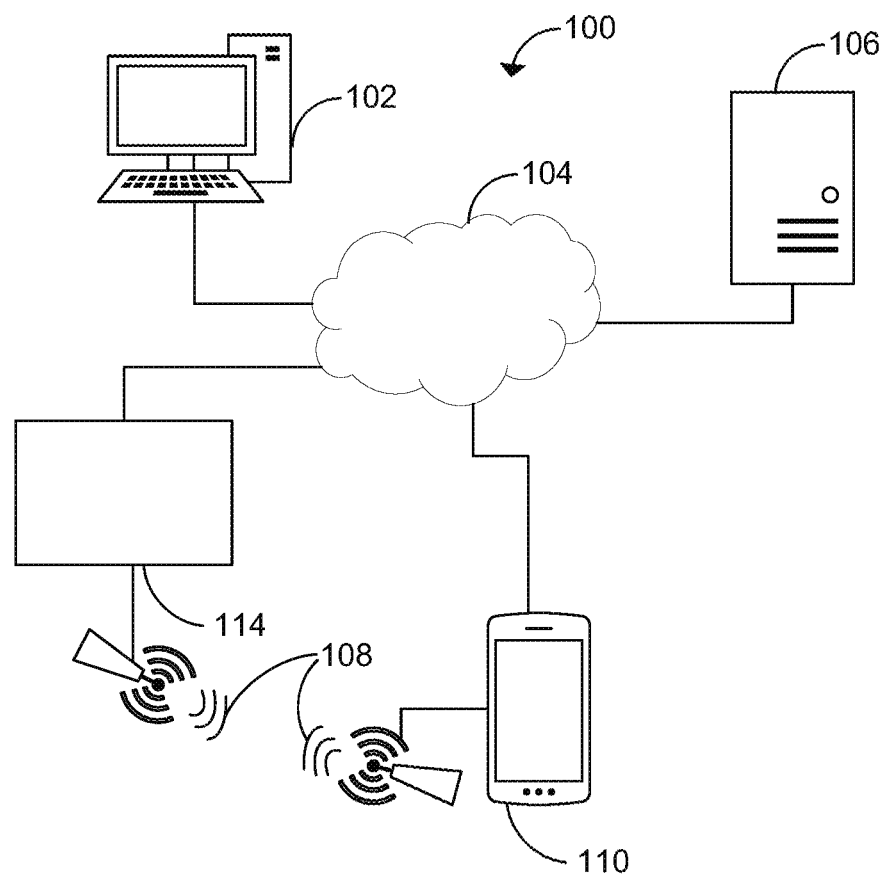
FIG. 1 is a system diagram of a secure storage system.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXAMPLE EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented such as hardware, software, and combinations thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

The apparatuses, systems, and methods disclosed herein generally provide a secure storage container that provides for secure and airtight storage of products. The secure storage container may provide for the storage of products in sub-containers and tracking of data metrics collected by a secure storage system.

Reference is first made to FIG. 1, which illustrates a system diagram of a secure storage system 100. The secure storage system 100 includes user mobile devices 110 and a computing device 102, a server 106, a network 104, a local area wireless connection 108, and a secure storage container 114.

A user device 110 may be any two-way communication device with capabilities to communicate with other devices. A user device 110 may be a mobile device such as one running the Google® Android® operating system or Apple® iOS® operating system. In another embodiment, user device 110 may be a smart device, such as a smart watch, smart glasses, an Internet of Things (IoT) device, a smart assistant such as Google® Home® or Amazon® Alexa®, or any other device that may be known.

Users (not shown) may each operate a user mobile device 110 in order to interact with the secure storage container 114. The user may interact with the secure storage container 114 over short distances using the local wireless connection 108 between the user mobile device 110 and the secure storage container 114. Alternatively, the user may interact with the secure storage container 114 using a network 104 between the mobile device 110 or computing device 102 and the secure storage container 114 and such network may further connect to the server 106.

Each user mobile device 110 includes and executes a client application, such as a secure storage system application, to pair with, and send and receive data to the secure storage container 114. The client application may be an application installed on the user device 110, for example, via an app store such as Google® Play® or the Apple® App Store®. In an alternate embodiment, the client application may be a web application provided by server 106 and the server 106 may pair with the secure storage container 114 and be capable of sending and receiving commands and data from it.

The network 104 may be any network or network components capable of carrying data including the Internet, Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The local wireless connection 108 may be any network or network components capable of facilitating wireless communication between devices, including wireless communications networks, for example, Bluetooth® (BT) or Bluetooth Low Energy® (BLE), Radio-Frequency Identification (RFID) systems, Near Frequency Communication (NFC) enabled networks, and others, including any combination of these.

As shown, the user mobile device 110 is configured to communicate with the computing device 102 and secure storage container 114 using the network 104 or local area connection 108. For example, the secure storage container 114 may provide an Application Programming Interface (API) endpoint for an application running on user mobile devices 110.

The secure storage container 114 may be in communication with the computing device 102 or server 106 using the network 104, and this may be referred to as an "online" mode. In an alternate embodiment, the user mobile device 110 may interact with the secure storage container 114 in the absence of the network 108 using a local area, and this may be referred to as an "offline" mode.

In an alternate embodiment, the server 106 may be paired with the secure storage container 114. In this case, the server 106 may provide an API for the mobile application at the user device 110 to send and receives requests, and the server 106 may authenticate the request from the mobile device independently for providing control of the secure storage container 114.

The computing device 102 is any networked computing device or system, including a processor and memory, and is capable of communicating with a network, such as the network 108. The computing device 102 may include one or more systems or devices that are communicably coupled to each other. The computing device may be a personal computer, a workstation, a server, a portable computer, a mobile phone, a laptop wireless coupled to an access point (e.g. a wireless router, a cellular communications tower etc.), a wirelessly enabled personal data assistant (PDA) or a smart phone, a terminal, a tablet computer, a game console over a wired or wireless connection, a WAP phone, or a combination of these.

The server 106 may store user information, sensor information (including temperature, humidity, and weights sensor data), and other related information in a database. The database at server 106 may be a Structured Query Language (SQL) such as PostgreSQL or MySQL or a not only SQL (NoSQL) database such as MongoDB, or Graph Databases etc.

Figure 2A:
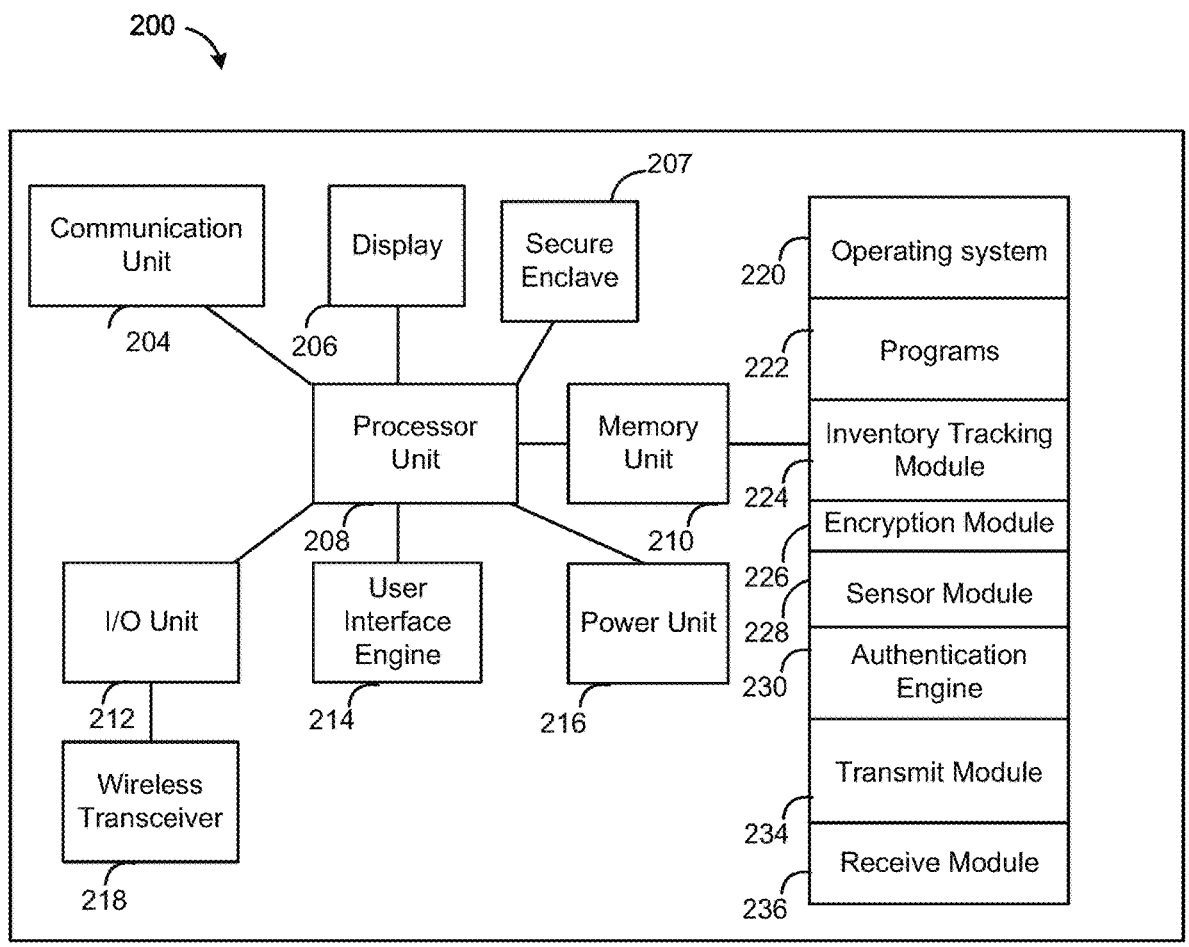
FIG. 2A is a block diagram of a user device.

Reference is next made to FIG. 2A, which shows a block diagram 200 of a user device, such as a user mobile device 110 from FIG. 1, according to an example. The user device 200 includes a communication unit 204, a display 206, a secure enclave 207, a processor unit 208, a memory unit 210, I/O unit 212, a user interface engine 214, a power unit 216, and a wireless transceiver 218.

The processor unit 208 controls the operation of the user device 200. The processor unit 208 can be any suitable processor, controller or digital signal processor. For example, the processor unit 208 may be a high performance general processor. In alternative embodiments, the processor unit 208 can include more than one processor with each processor being configured to perform different dedicated tasks. In alternative embodiments, it may be possible to use specialized hardware to provide some of the functions provided by the processor unit 208. For example, the processor unit 208 may include a standard processor, such as an Intel® processor, an ARM® processor or a microcontroller.

The communication unit 204 can include wired or wireless connection capabilities. The communication unit 204 can include a radio that communicates utilizing Code-Division Multiple Access (CDMA), Global System for Mobile (GSM), General Packet Radio Service (GPRS) or Bluetooth® protocol according to standards such as IEEE 802.11a, 802.11b, 802.11g, or 802.11n. The communication unit 204 can be used by the user device 200 to communicate with other devices or computers.

Figure 15E:
FIG. 15E is a mobile application displaying an alternate history user interface.
Figure 16:
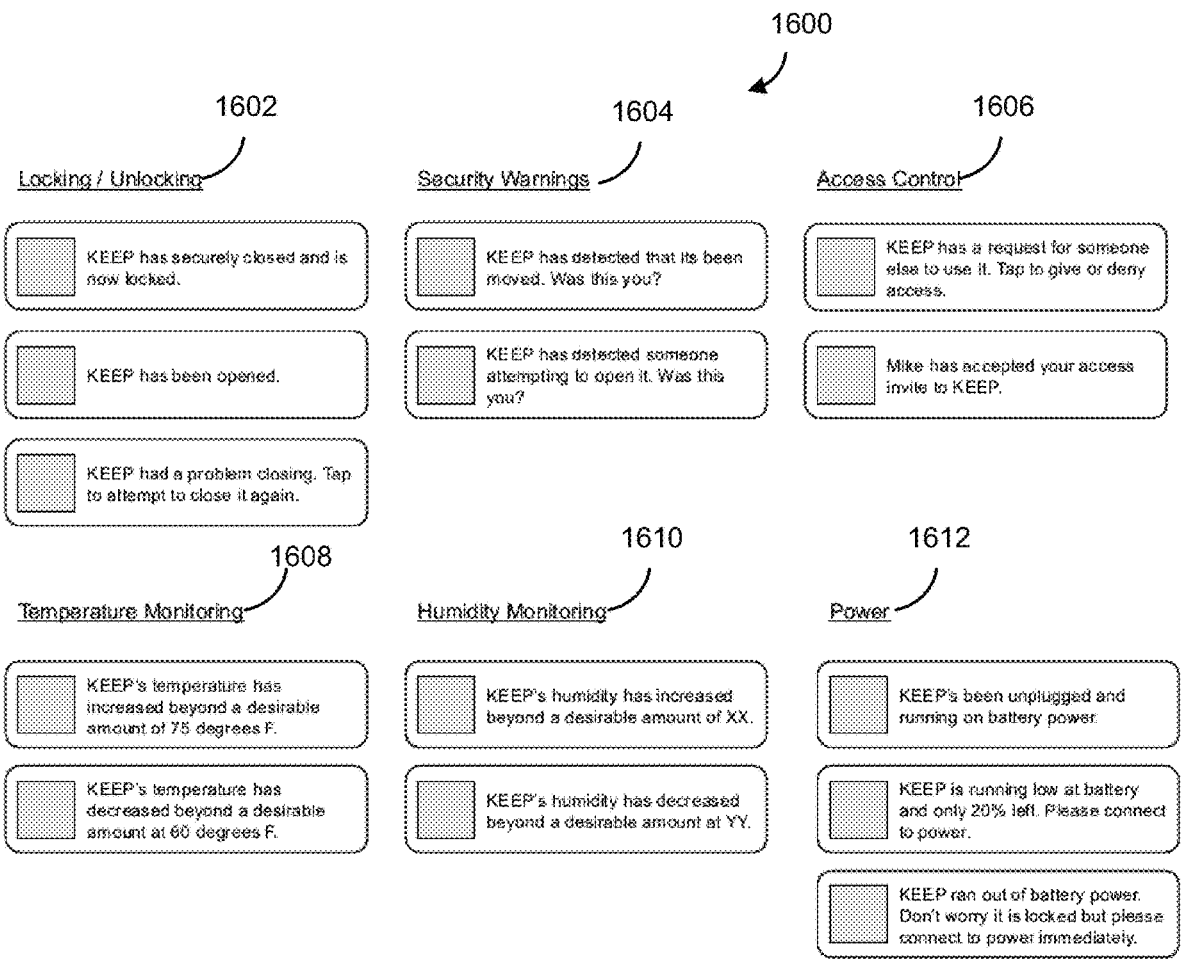
FIG. 16 is a user interface for configuring various secure storage container notifications at a mobile application paired with the secure storage container.
Figure 17:
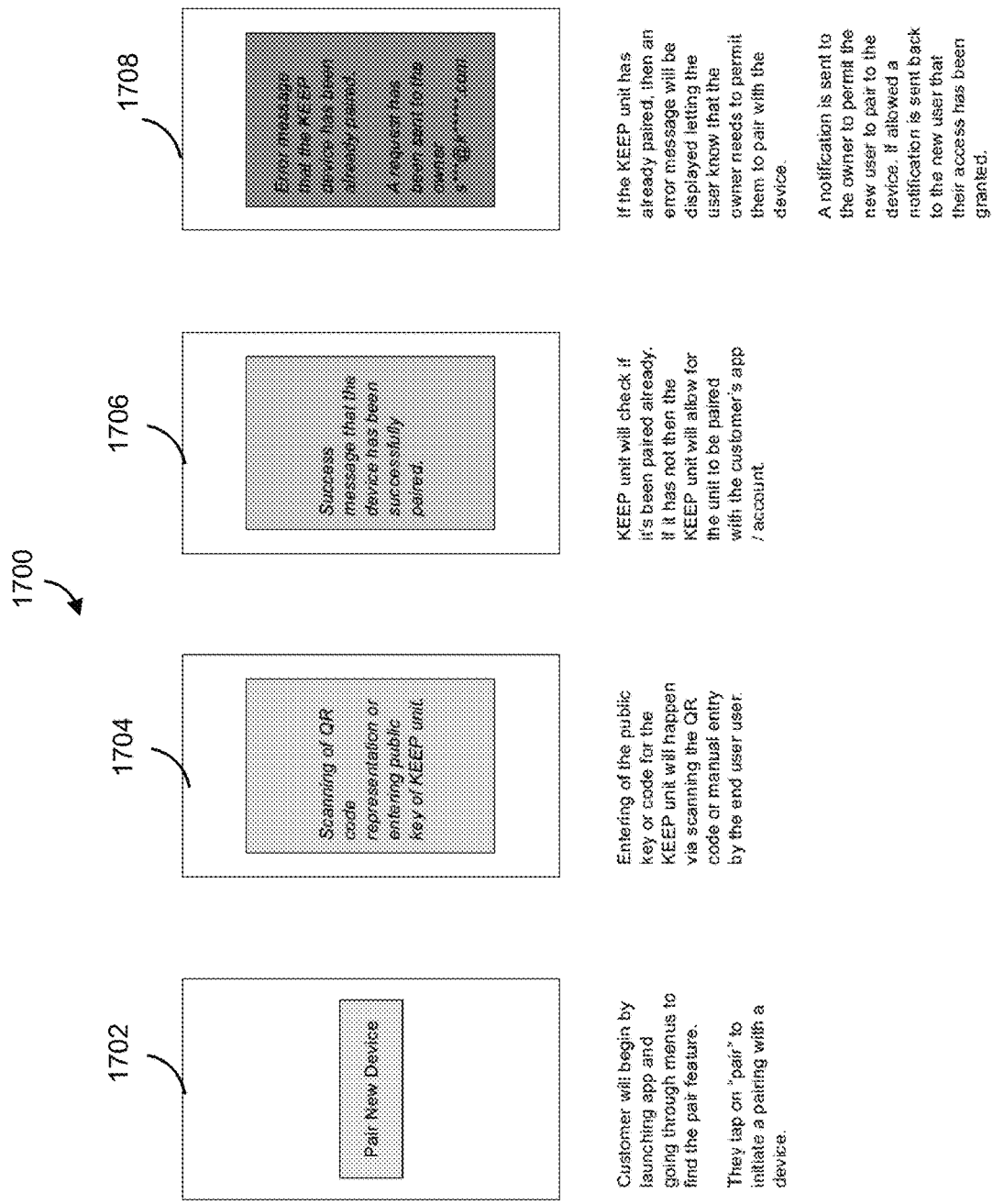
FIG. 17 is a user interface showing a pairing and authentication process between a secure storage system and a mobile device.

The processor unit 208 can also execute a graphical user interface (GUI) engine 214 that is used to generate various user interfaces shown on the display 206, some examples of which are shown and described herein, such as interfaces shown in FIG. 15-17.

The display 206 may be an Light-Emitting Diode (LED) or Liquid Crystal Display (LCD) based display, and may be a touch sensitive user input device that supports gestures.

The I/O unit 212 can include, but is not limited to, at least one of a mouse, a keyboard, a touch screen, a thumbwheel, a track-pad, a track-ball, a card-reader, voice recognition software and the like again depending on the particular implementation of the user device 200. In some cases, some of these components can be integrated with one another.

Communication unit 204 may communicate with the wireless transceiver 218 to transmit and receive information via local wireless connection 108 (see FIG. 1). The communication unit 204 may provide communications using the local wireless connection 108 over the shared wireless media using a network communications protocol such as BT or BLE. The communication unit 204 may further communicate with network 104 (see FIG. 1) using a protocol 802.11x to connect to the broader network and/or Internet.

The power unit 216 can be any suitable power source that provides power to the user device 200 such as a power adaptor or a rechargeable battery pack depending on the implementation of the user device 200 as is known by those skilled in the art.

The memory unit 210 comprises software code for configuring the mobile device and mobile application running on the mobile device, including an operating system 220, programs 222, an inventory tracking module 224, an encryption module 226, a sensor module 228, an authentication engine 230, a transmit module 234, and a receive module 236.

The memory unit 210 can include RAM, ROM, one or more hard drives, one or more flash drives or some other suitable data storage elements such as disk drives, etc. The memory unit 210 is used to store an operating system 220 and programs 222 as is commonly known by those skilled in the art. For instance, the operating system 220 provides various basic operational processes for the user device 200. For example, the operating system 220 may be a mobile operating system such as Google® Android® operating system, or Apple® iOS® operating system, or another operating system.

The programs 222 include various user programs so that a user can interact with the user device 200 to perform various functions such as, but not limited to, viewing and manipulating data as well as sending messages as the case may be.

The inventory tracking module 224 receives sensor data from the sensor module 228, which is based on sensor data from the secure storage container. The inventory tracking module 224 allows for tracking of the inventory in the secure storage container 114. The inventory tracking module 224 may include a database that includes historical inventory data from the secure storage container. The inventory tracking module 224 may receive weight data from one or more weight sensors in the secure storage container, and may determine usage data and inventory data based on the sensor data. The inventory tracking module 224 may generate inventory notifications that may be displayed at display 206 to a user.

The encryption module 226 is in communication with local wireless transceiver 218 and transmit module 234 to provide encrypted communications between the mobile device and the secure storage container. The encryption module 226 may function to pair the mobile application of the mobile device with the secure storage container. The pairing may include the encryption module 226 generating a private mobile key and a public mobile key. The private mobile key may be stored in secure enclave 207. The public mobile key may be transmitted to the secure storage container using wireless transceiver 218. The encryption module 226 may further receive and store a public container key from the storage container. The encryption module 226 may encrypt data including messages sent to the secure storage container 114 via the wireless transceiver 218 using the public container key. The encryption module 226 may decrypt data including messages and sensor data from the secure storage container using the private mobile key stored in the secure enclave 207.

In an alternate embodiment, a server may provide the encryption module 226 of the mobile device and may pair with the secure storage container instead of the mobile device.

The sensor module 228 receives sensor data from the secure storage container via the wireless transceiver 218, and is configured to store measurements from those sensors in a database. Examples of one or more sensor data received from the secure storage container includes weight sensor data, humidity sensor data, temperature sensor data, accelerometer data, gyroscope data, magnetic compass sensor data, magnetometer data, camera data, Global Positioning System (GPS) sensor data and Near Field Communication (NFC) sensor data, etc. The sensor module 228 is configured to determine locking/unlocking event data, weight change data of the stored substances, movement of the substances within the box, temperature sensor data, and humidity sensor data. This data may be stored in a database at sensor module 228.

The authentication engine 230 is configured to authenticate the user of the mobile device to determine if an authorized user is using the mobile device. The authentication engine 230 may be in communication with a biometric device at I/O unit 212 connected to a camera, a fingerprint scanner, etc. The authentication engine 230 may also be in communication with a user input device at the I/O unit 212 for a user to enter a password or pin code to authenticate themselves. The authentication unit 230 may further be in communication with a server (via communication unit 204) for remote authentication of a user at the mobile device based on an authentication request made to the server.

The transmit module 234 is configured to, in collaboration with other components of the user device 200, generate information signals for transmittal. The transmit module 234 may be in communication with a secure storage container using either the wireless transceiver 218 or the communication unit 204, and a server via the communication unit 204. The transmit module 234 is configured to transmit an unlock message when the user has indicated his/her intention to unlock a secure storage container 114. Further, the transmit module 234 is configured to transmit a lock message when the user has indicated his/her intention to lock a secure storage container 114. The transmit module 234 may be in communication with the encryption module 226 to encrypt the messages to the secure storage container. In alternate embodiments, the transmit module 234 may be configured to transmit a humidity adjust message, a temperature adjust message, a find my secure storage container message, a humidity query message, a temperature query message, or a weight query message to the secure storage container 114.

In an alternate embodiment, the locking and unlocking messages may be sent to a server 106 instead of the secure storage container 114, in which case the server 106 and the secure storage container 114 are paired together.

The receive module 236 is configured to receive one or more information signals from the secure storage container via local wireless transceiver 218 or communication unit 204. The receive module 236, in collaboration with other components of the user device 200, is configured to receive data including messages and sensor data from the secure storage system 100. The data may include, but are not limited to, accelerometer data, gyroscope data, magnetometer data, compass data, image data, audio data, video data), GPS data, locking/unlocking event data, weight change data of the stored substances, movement of the substances within the box, temperature sensor data, and humidity sensor data.

Figure 2B:
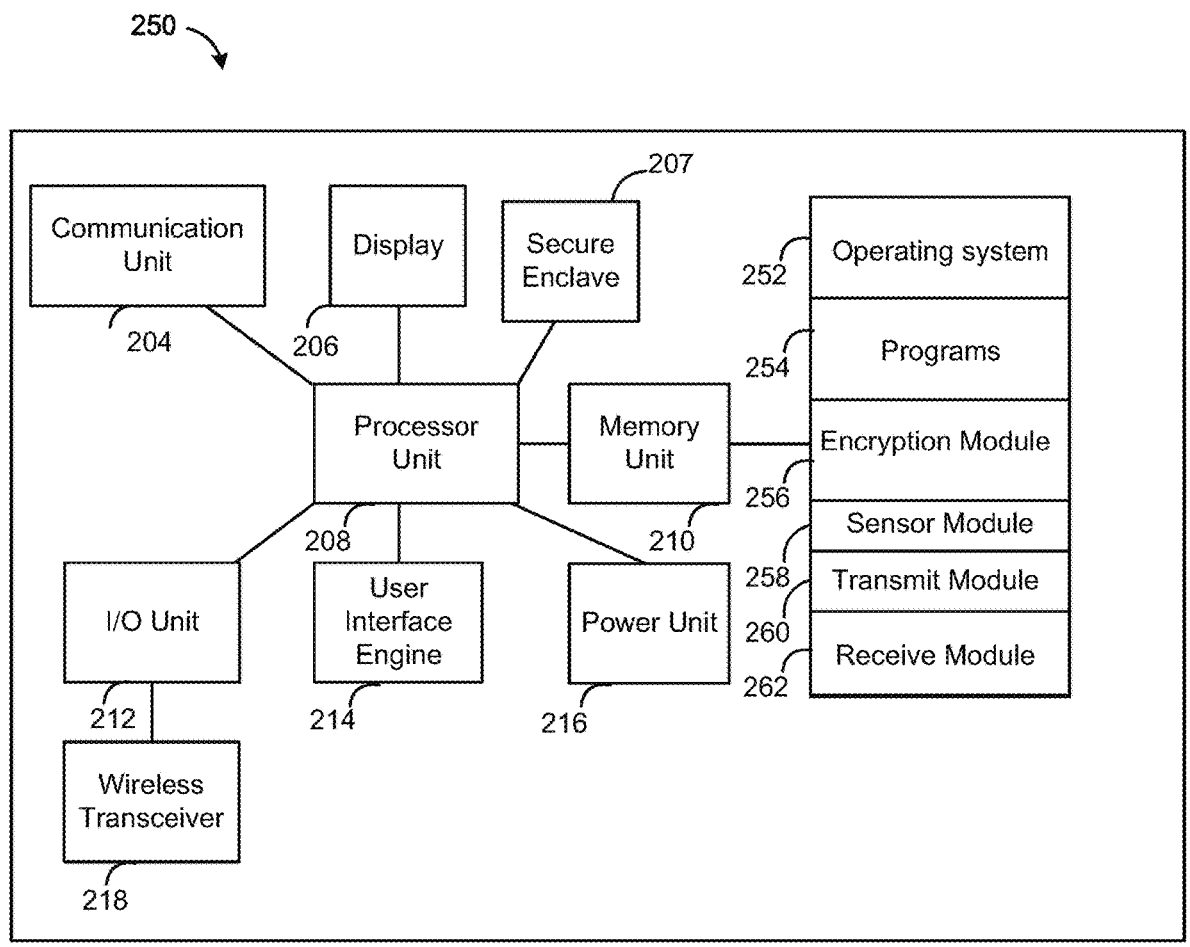
FIG. 2B is a block diagram of a secure storage container.

Referring next to FIG. 2B, there is shown a block diagram 250 of a secure storage container. For FIGS. 2A-2B, like references refer to like components, including the communication unit 204, the display 206, the secure enclave 207, processor unit 208, memory unit 210, I/O unit 212, user interface engine 214, power unit 216, and wireless transceiver 218.

The display 206 of the secure storage container may be an LED or LCD display on the exterior of the secure storage container 114.

In memory unit 210, the secure storage container may have an operating system 252. The operating system may be an embedded system, Windows CE, a Raspberry Pi based Linux system, an Arduino, or the like. The operating system 252 may function to provide a low-power operating system.

The programs 254 may generally configure the processor of the secure storage container 114 to function with a server and a mobile application such that a container that is remotely lockable and unlockable is provided.

The encryption module 256 is in communication with local wireless transceiver 218 and transmit module 260 to provide encrypted communications between the mobile device, the server, and the secure storage container. The encryption module 256 may function to pair the mobile application of the mobile device with the secure storage container. The pairing may include the encryption module 256 generating a private container key and a public container key. The private container key may be stored in secure enclave 207. The public container key may be transmitted to the mobile application using wireless transceiver 218. The encryption module 256 may further receive and store a public mobile key from a mobile application at the mobile device. The encryption module 256 may encrypt data including messages sent from the secure storage container 114 (see FIG. 1) to the mobile application using the public mobile key. The encryption module 256 may decrypt data including messages and queries from the secure storage container using the private container key stored in the secure enclave 207.

The sensor module 258 receives sensor data via I/O Unit 212 from one or more sensors in the secure storage container. The sensor module 258 is in communication with the transmit module 260 to send sensor data from the one or more sensors to the mobile application. Examples of one or more sensors in communication with the sensor module 258 of the secure storage container include one or more weight sensors, a humidity sensor, a temperature sensor, an accelerometer, a gyroscope, a magnetic compass sensor, a magnetometer, a camera, a Global Positioning System (GPS) sensor and an Near Field Communication (NFC) sensor, etc. The sensor module 258 is configured to determine locking/unlocking events via a contact sensor with the container top. The data provided by the sensor module 258 may also include weight change data of the stored substances, movement data and/or acceleration data of the secure storage container, movement data of the substances within the box, temperature sensor data, and humidity sensor data.

The transmit module 260 is configured to, in collaboration with other components of the secure storage container 114 (see FIG. 1), generate information signals for transmittal. The transmit module 260 may be in communication with a mobile application using either the wireless transceiver 218 or the communication unit 204, and a server via the communication unit 204. The transmit module 260 is configured to transmit sensor data from the secure storage container 114 to the mobile application. The data may include, but are not limited to, accelerometer data, gyroscope data, magnetometer data, compass data, image data, audio data, video data, GPS data, locking/unlocking event data, weight change data of the stored substances, movement of the substances within the box, temperature sensor data, and humidity sensor data. Further, the transmit module 260 may transmit unauthorized access messages from the secure storage container 114 to the server or the mobile application. The transmit module 260 may be in communication with the encryption module 256 to encrypt the messages to the mobile application or the server.

The receive module 262 is configured to receive one or more information signals from the mobile application via local wireless transceiver 218, or the mobile application and server via communication unit 204. The receive module 262, in collaboration with other components of the secure storage container 250, is configured to receive messages and queries from the mobile application and the server and perform actions associated with the messages and data in response to the queries. Messages may include locking messages, unlocking messages, and pairing requests. A locking message may be decrypted and validated by the encryption module 256, and in response to a validated locking message the secure storage container may lock the top closed to the one or more walls as recited herein. An unlocking message may be decrypted and validated by the encryption module 256, and in response to a validated unlocking message the secure storage container may unlock the top from the container so a user may access the contents. Responses to queries may be sent back to either the server or the mobile application by the transmit module 260.

The receive module 262 is configured to receive an unlock message when the user has indicated his/her intention to unlock a secure storage container 114 at the mobile application. Further, the receive module 262 is configured to receive a lock message when the user has indicated his/her intention to lock a secure storage container 114 at the mobile application. When the receive module 262 receives a lock message, it transmits an electronic signal to a lock mechanism that secures the top of the container to the one or more walls of the container and the container enters a locked position. When the receive module 262 receives an unlock message, it transmits an electronic signal to the lock mechanism securing the top of the container to the one or more walls of the container, thereby causing the lock mechanism to unlock and the container to enter an unlocked position. In a first embodiment, the lock and unlock messages may be received at wireless transceiver 218 from the mobile application. The receive module 262 may be in communication with the encryption module 256 to decrypt the messages to the secure storage container.

In an alternate embodiment, the locking and unlocking messages may be sent to a server instead of the secure storage container, where the server and the secure storage container are paired together. For example, the lock and unlock messages may be received from communication unit 204 from the server or the mobile application at the mobile device.

Referring next to FIGS. 3A-3D, there is shown a secure storage container 301 in a closed position from perspective 350, side 352, front 354, and top 356 views.

The closed secure storage container 301 further comprises a base 300, at least one wall 302 extending from the base 300 defining a storage cavity, a top 304 re-sealable closing to at least one wall 302 along re-sealable closure 312. The top 304 may be configured to cooperate with the at least one wall 302 to provide a re-sealable closure 312 for the storage cavity 310. The re-sealable closure 312 may be substantially air-tight and odor sealing.

The closed secure storage container 301 may have the top 304 locked to the at least one wall 302, referred to as the locked position. The locked position provides a substantially tamper resistant securement of the top 304 to the at least one wall 302. The locking between the top and the at least one wall 302 may be performed with a locking mechanism (not shown). The locking mechanism may be a mechanical lock having an unlocked position and a locked position, or alternatively the locking mechanism may be electromagnetic and may lock based upon the magnetization or demagnetization of an electromagnet in cooperation with a ferromagnetic portion of the top 304.

The at least one wall 302, the base 300, and the top 304 of the secure storage container 301 may be made from any rigid material, such as plastic, wood, aluminum, or steel, or any other rigid material.

Figure 12:
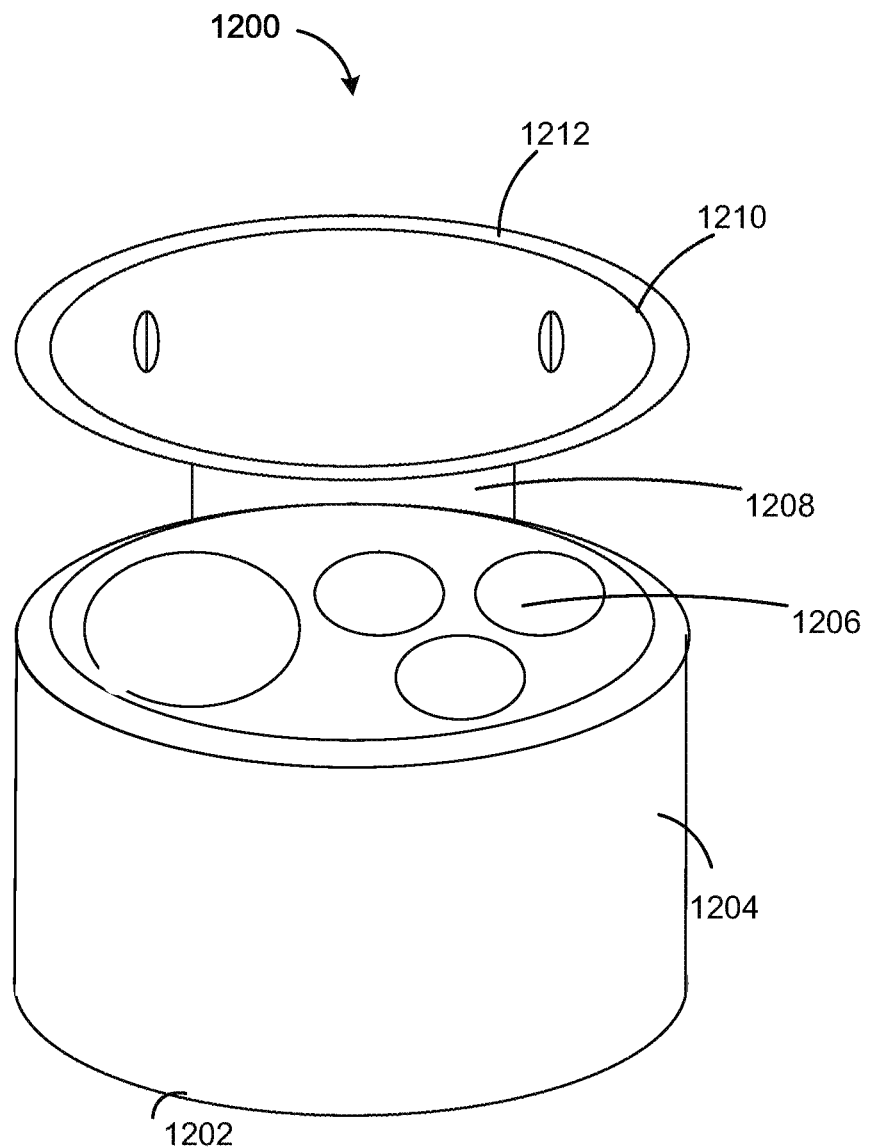
FIG. 12 is a perspective view of an open secure storage container with a cylindrical shape.

In a further embodiment (as shown in FIG. 12), the secure storage container 301 may have one wall extending from the base 300 defining the storage cavity, and the secure storage container may be generally a cylinder.

In a further embodiment, the secure storage container 301 may have three walls extending from the base 300 defining the storage cavity, and the secure storage container may be generally a triangular prism.

In a further embodiment, the secure storage container 301 may have four walls extending from the base 300 defining the storage cavity, and the secure storage container may be generally a rectangular prism.

In a further embodiment, the secure storage container may have rounded corners between each of the one or more walls 302, between the one or more walls 302 and the top 304, and between the one or more walls 302 and the base 300.

Referring next to FIGS. 4A-4D, there is shown a secure storage container 401 in an open position. The secure storage container 401 has an electronic lock 314 that provides securement between the top 304 and the least one wall 302 in a locked position. The secure storage container 401 may optionally have a hinge 305 connecting the top 304 to the one or more walls 302.

The open secure storage container 401 has a storage cavity 310 for storing products. The storage cavity may have a main cavity 416 and an auxiliary cavity 418 divided by a divider 406. The main cavity may be defined by a base surface 402 of base 300, the one or more walls 302, and optionally a divider 406. The base surface 402 may further comprise one or more weight sensors. Optionally, a divider 406 may be provided to partition the storage cavity 310 into a main cavity 416 and the auxiliary cavity 418. The auxiliary cavity 418 may be defined by an auxiliary surface 404 of base 300, one or more walls 302, and the divider 406. The one or more weight sensors are in communication with the sensor module of the secure storage container.

Figure 4A:
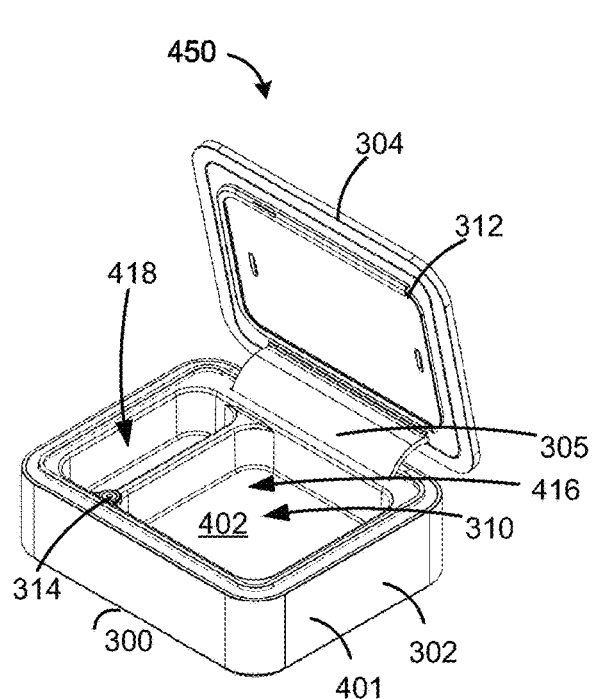
FIG. 4A is a perspective view of an open secure storage container.
Figure 4B:
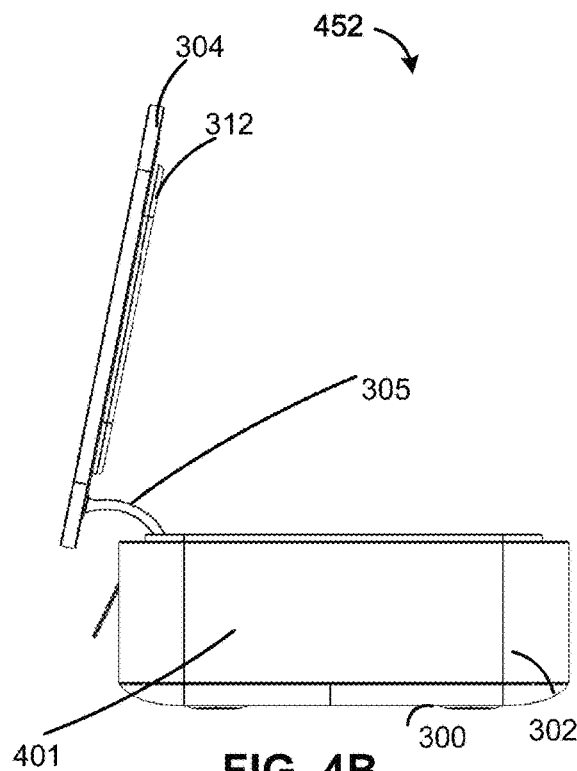
FIG. 4B is a side view of an open secure storage container.
Figure 4C:
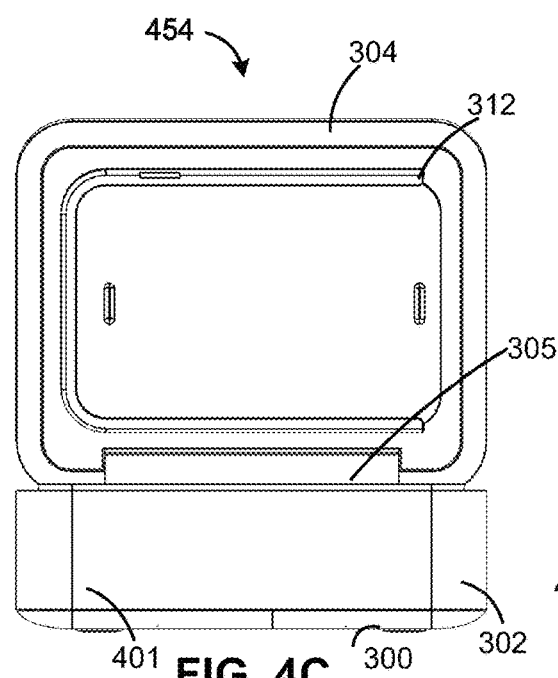
FIG. 4C is a front view of an open secure storage container.
Figure 4D:
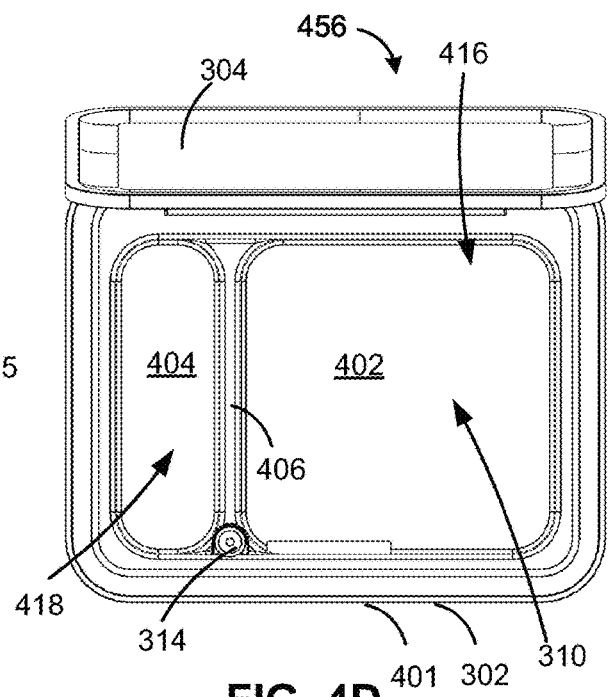
FIG. 4D is a top view of an open secure storage container.
Figure 4E:
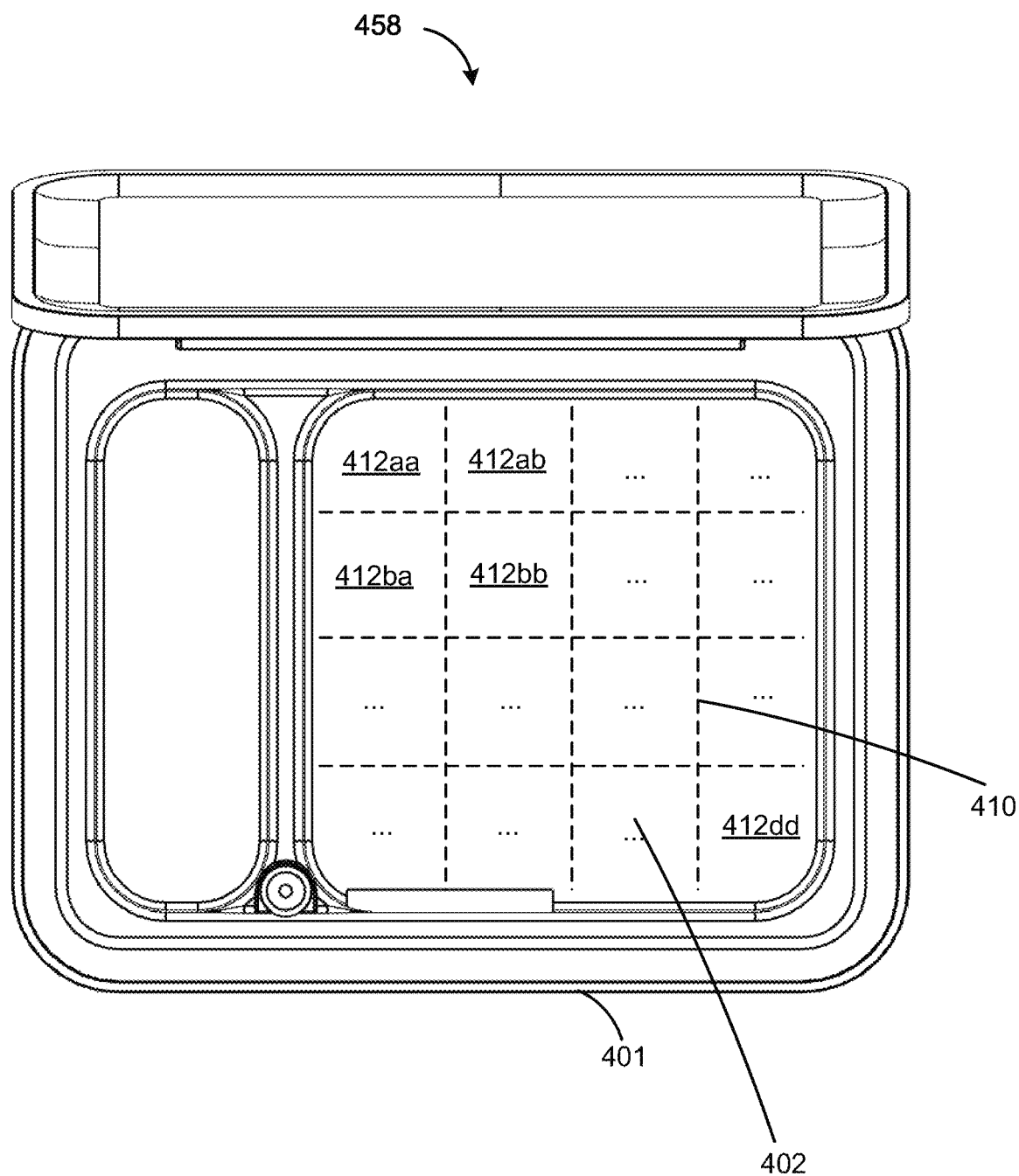
FIG. 4E is a top view of an open secure storage container having one or more base portions.

Referring next to FIG. 4E, there is shown a top view 458 of an open secure storage container 401. The secure storage container base surface 402 may further comprise one or more base portions 412 (for example, 412aa, 412ab, 412ba, 412bb, 412dd, etc.). The base portions 412 may be generally square, or may take other shapes as required. The base portions 412 may be delineated by grid lines 410. The base portions 412 may comprise a regularly spaced grid arrangement of base portions as shown, each base portion 412 comprising a weight sensor (not shown). As shown, there is a 4×4 grid shown, having a first row of base portions 412aa to 412ad, a second row of base portions 412ba to 412bd, a third row of base portions 412ca to 412cd, and a fourth row of base portions 412da to 412dd. It is understood that the base portion grid may take any arrangement of rows and columns, and the individual base portions may be sized the same, or sized differently. It is further understood that while a 4×4 grid is shown, the grid itself may be larger than 4×4 or as small as 2×1. The base portions 412 are shown as square, but may be shaped as circles, triangles, or another shape. Each base portion may provide an individual weight sensor measurement that may be measurable by the secure storage container 401.

Referring next to FIGS. 5A-5D, there is shown a hinge mechanism 305 for connecting a top of a secure storage container to the at least one wall 302 of the secure storage container. The optional hinge 305 may connect the top 304 with the wall 302. The hinge 305 may allow for opening of the top 304 when the electronic lock 314 is in an unlocked configuration. The hinge 305 may be, but is not limited to, telescopic, pivoting, or rotational. The hinge 305 may have a rotation sensor or a contact sensor integrated with it to detect unauthorized access attempts to the secure storage container.

Figure 5A:
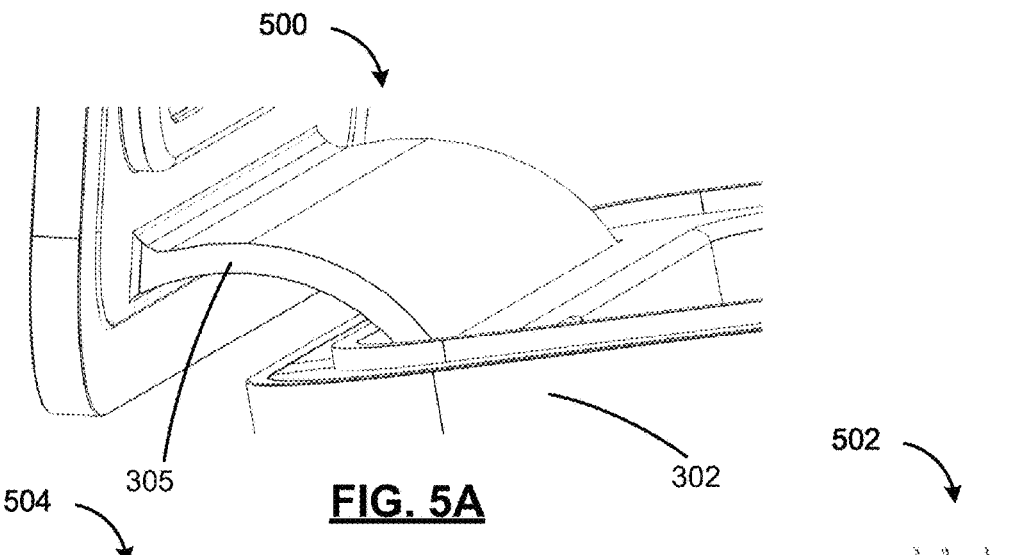
FIG. 5A is a perspective view of a hinge of a secure storage container.
Figure 5B:
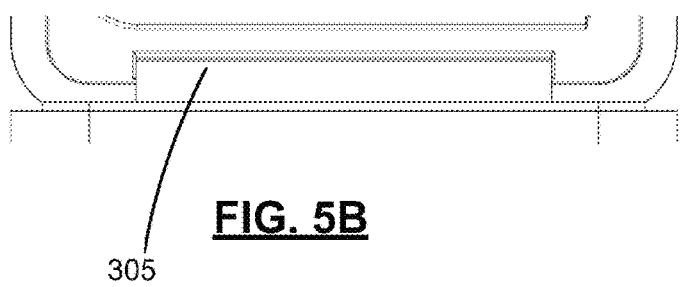
FIG. 5B is a front view of a hinge of a secure storage container.
Figure 5C:
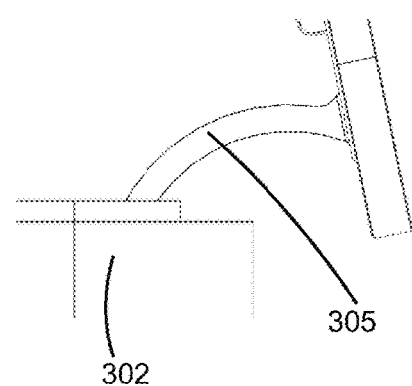
FIG. 5C is a side view of a hinge of a secure storage container.
Figure 5D:
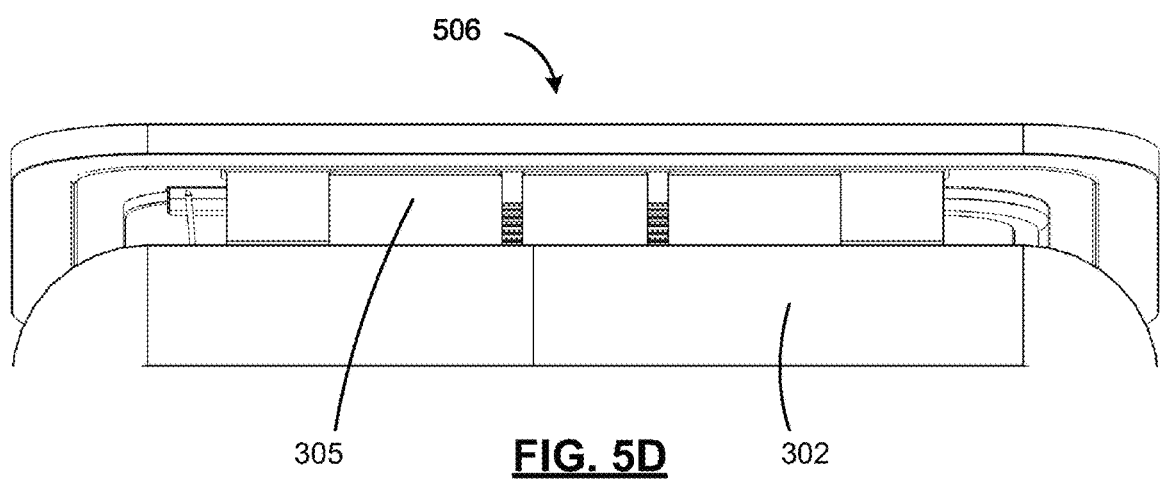
FIG. 5D is a bottom view of a hinge of a secure storage container.
Figure 5E:
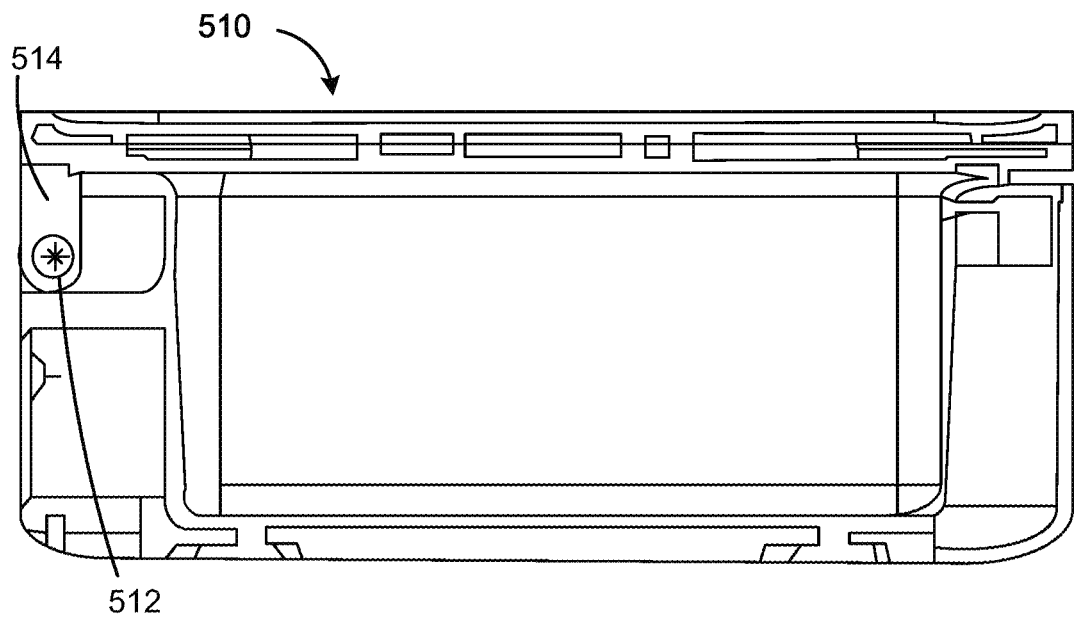
FIG. 5E is a cross-sectional view showing an alternate hinge of a secure storage container.
Figure 5F:
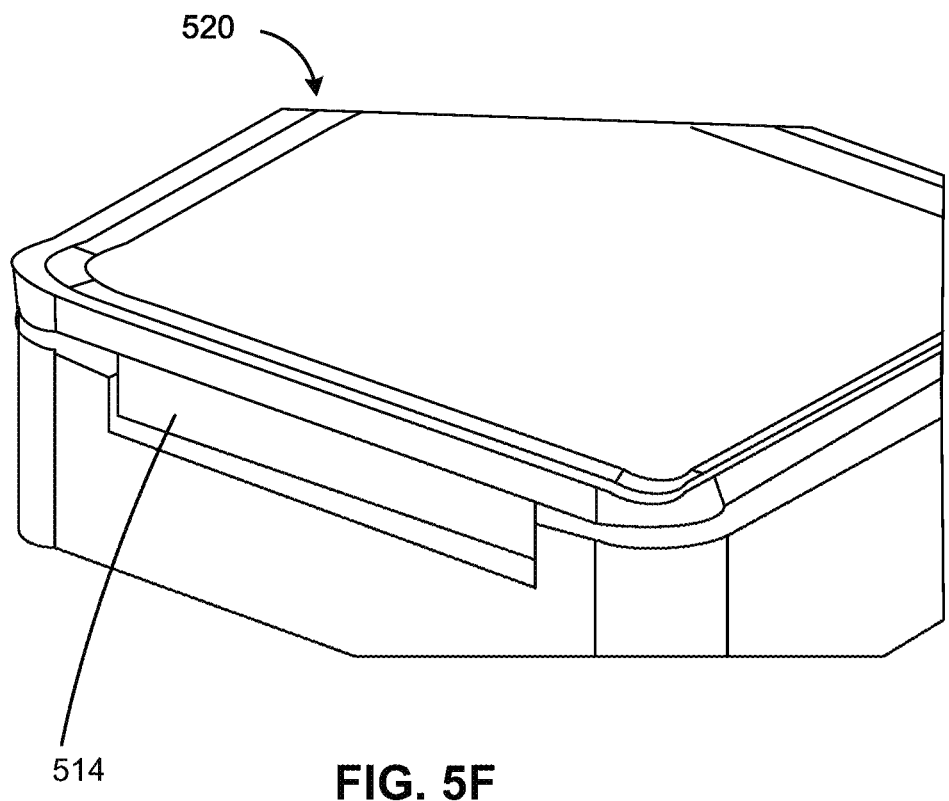
FIG. 5F is a partial rear perspective view showing the alternate hinge of FIG. 5E.
Figure 5G:
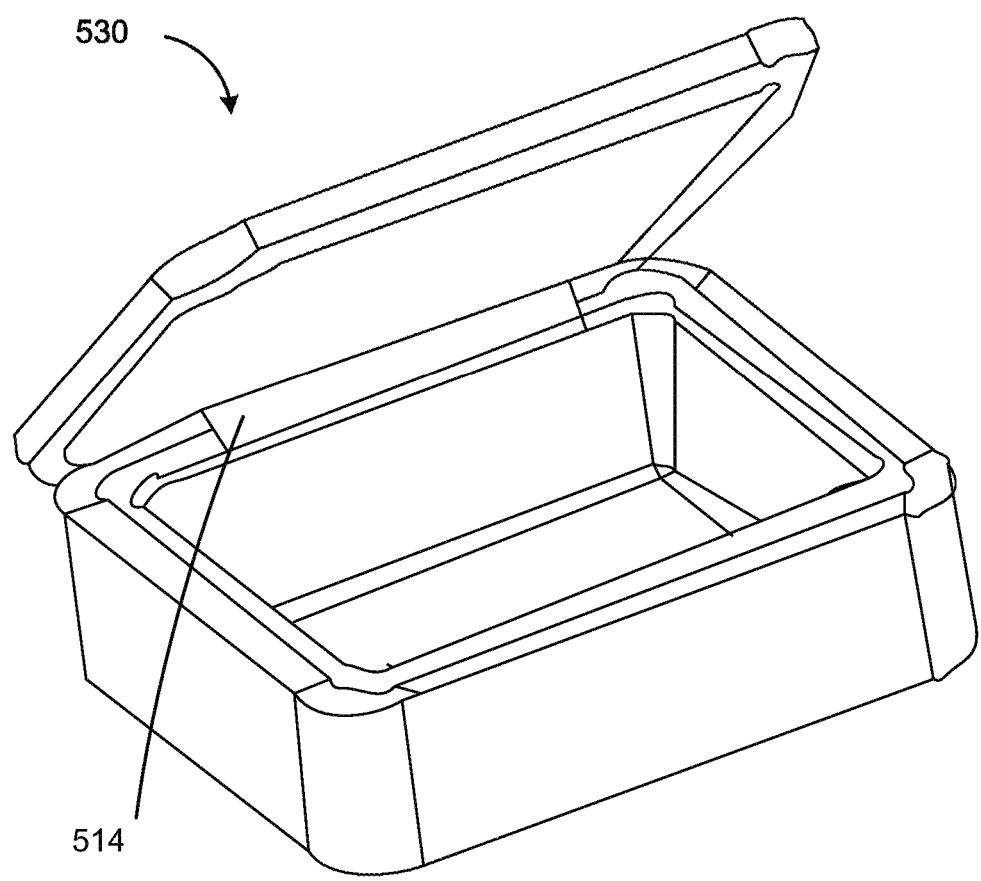
FIG. 5G is a partial interior perspective view showing the alternate hinge of FIG. 5E.

Referring next to FIGS. 5E-5G, there is shown an alternate hinge mechanism 514 for connecting a top of a secure storage container to the at least one wall of the secure storage container. The optional alternate hinge 514 may connect the top with the wall. The hinge 514 may have an attachment 512 between the top and a wall, and the attachment 512 may allow for pivoting engagement. The alternate hinge mechanism 514 may be spring loaded and may be biased towards an open position, such that when the container is unlocked the lid swings open.

Figure 6:
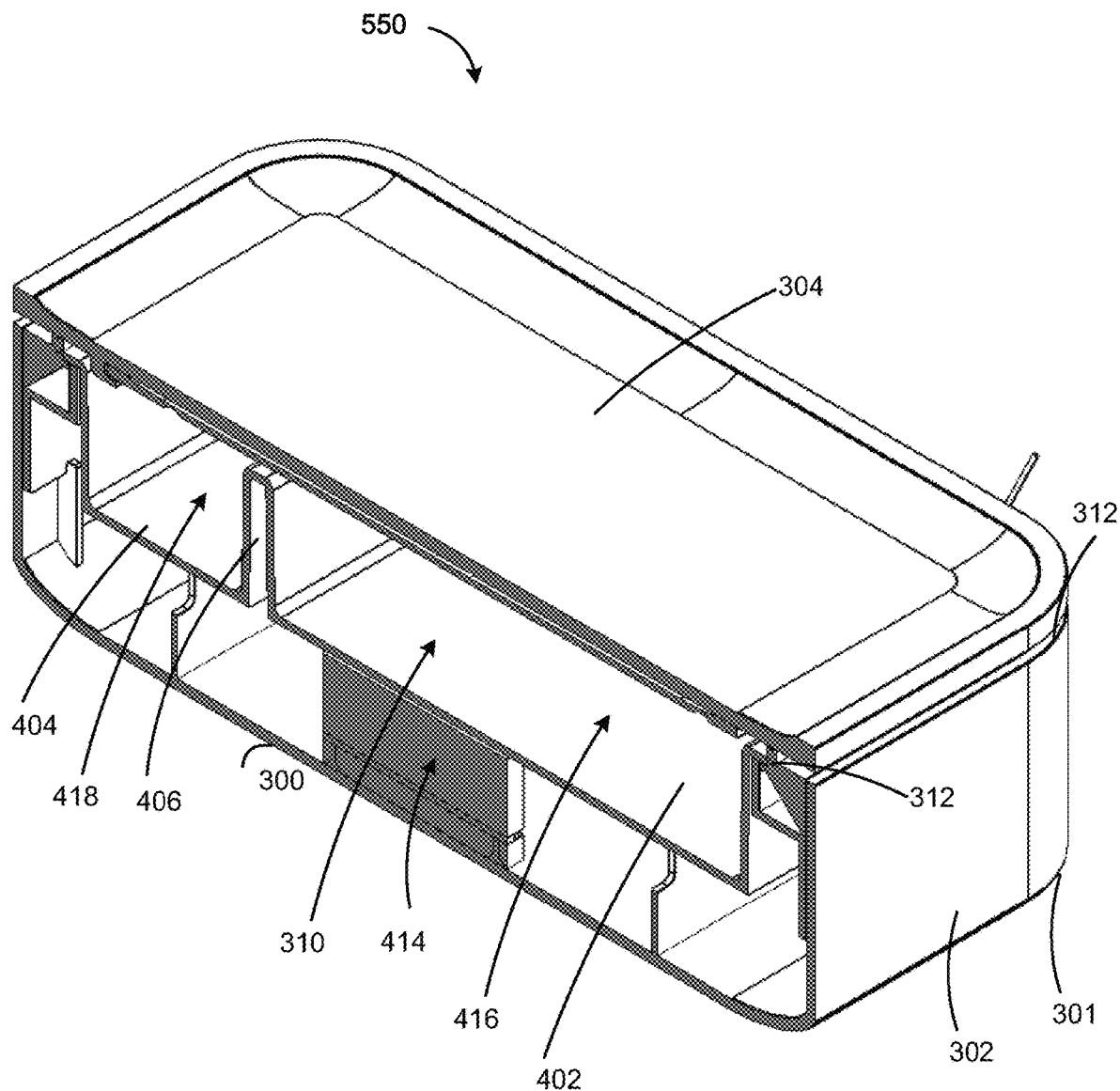
FIG. 6 is a cross sectional perspective view of a closed secure storage container.

Referring next to FIG. 6, there is shown a cross sectional perspective view 550 of a closed secure storage container 301. The container has a base 300, the base having at least one wall 302 extending from the base 300. In the storage cavity 310, products may be securely stored. The storage cavity 310 may have a divider 406 that separates an auxiliary cavity 418 and a main cavity 416. The auxiliary cavity may have an auxiliary surface 404. The base surface 402 may have one or more base portions (see FIG. 4E at 412) having weight sensors.

A processor cavity 414 may be disposed below the storage cavity 310, and may store the processor, and other associated digital components (see e.g. FIG. 2B).

The container top 304 may interface with the base 300 along the re-sealable closure 312, and may provide a substantially airtight seal between the base 300 and the top 304.

Figure 7A:
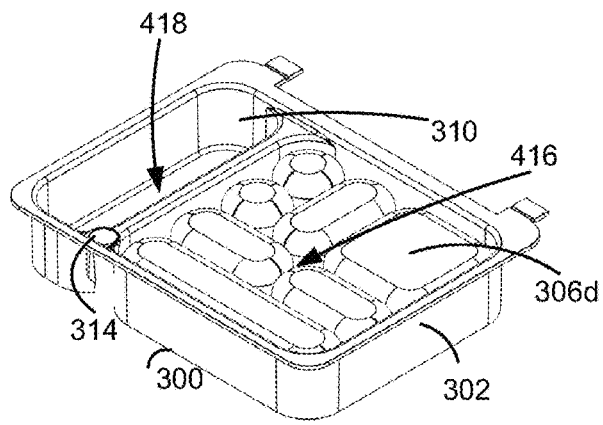
FIG. 7A is a portion perspective view of sub-containers in the bottom compartment of a secure storage container.
Figure 7B:
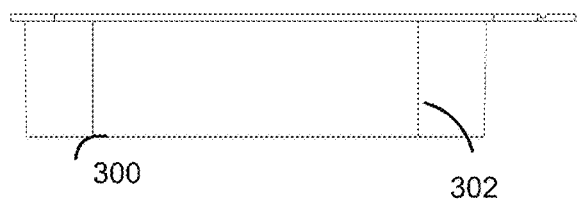
FIG. 7B is a portion side view of sub-containers in the bottom compartment of a secure storage container.
Figure 7C:
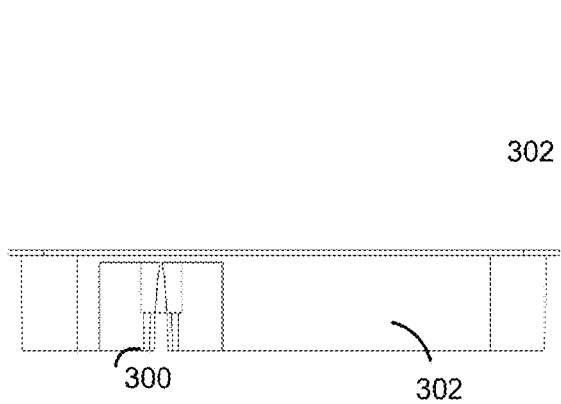
FIG. 7C is a portion front view of sub-containers in the bottom compartment of a secure storage container.
Figure 7D:
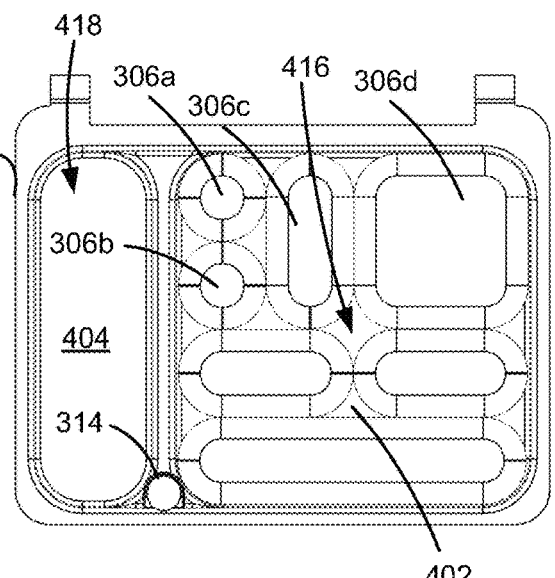
FIG. 7D is a portion top view of sub-containers in the bottom compartment of a secure storage container.
Figure 7E:
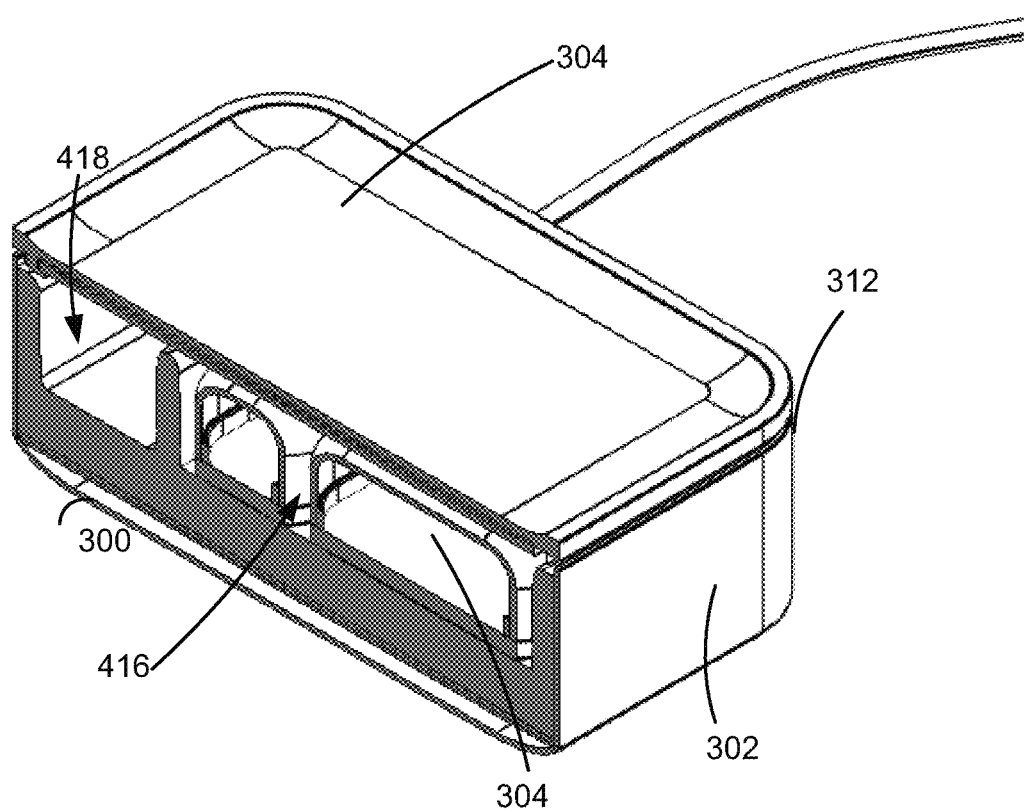
FIG. 7E is a cross sectional view of a closed secure storage container housing sub-containers.

Referring next to FIGS. 7A-7E, there is a portion view of the secure storage container having a plurality of sub-containers. FIG. 7E shows a cross-sectional view of the plurality of sub-containers position inside a secure storage container in the locked position. FIGS. 7A-7D shows the bottom compartment including the auxiliary cavity 418 and the main cavity 416 having the plurality of sub-containers 306 disposed therein. For example, the main cavity 416 may have a first sub-container 306a, a second sub-container 306b, a third sub-container 306c and a fourth sub-container 306d. The exterior of the sub-containers 306 may further comprise a grip, including one or more grip protrusions.

The first sub-container 306a and the second sub-container 306b may be sized to substantially cover a 1×1 base portion of the base surface 402. The third-sub-container 306c may substantially cover a 1×2 base portion of the base surface 402. The fourth sub-container 306d may substantially cover a 2×2 base portion of the base surface 402.

In an alternate embodiment, the secure storage container may have an NFC sensor, RFID sensor, or a camera sensor disposed inside the main cavity 416 in order to provide for identification of the one or more sub-containers 306. In this alternate embodiment, the one or more sub-containers 306 each comprise an identifier, that is readable by the NFC sensor, RFID sensor, or camera sensor. The sub-container identifier may identify the type of product inside the sub-container 306, the quantity of product inside the sub-container 306, the weight of the product inside the sub-container 306, the weight of the sub-container 306, the two-dimensional size of the sub-container 306 (for example, 2×2 base portions), a product expiry of the product inside the sub-container 306, a packaging date of the product inside the sub-container 306, etc.

Figure 8A:
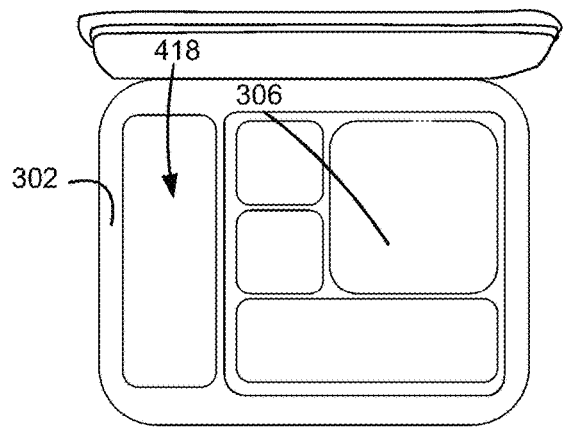
FIG. 8A is an example first arrangement of sub-containers in the bottom compartment of a secure storage container.
Figure 8B:
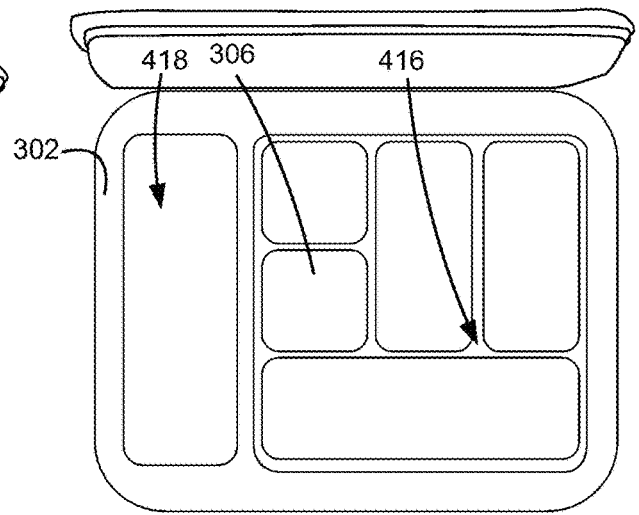
FIG. 8B is an example second arrangement of sub-containers in the bottom compartment of a secure storage container.
Figure 8C:
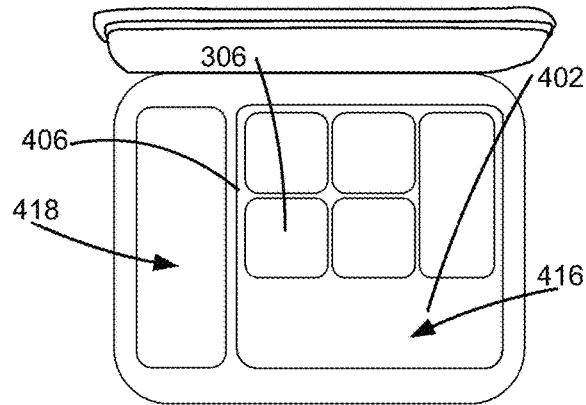
FIG. 8C is an example third arrangement of sub-containers in the bottom compartment of a secure storage container.
Figure 8D:
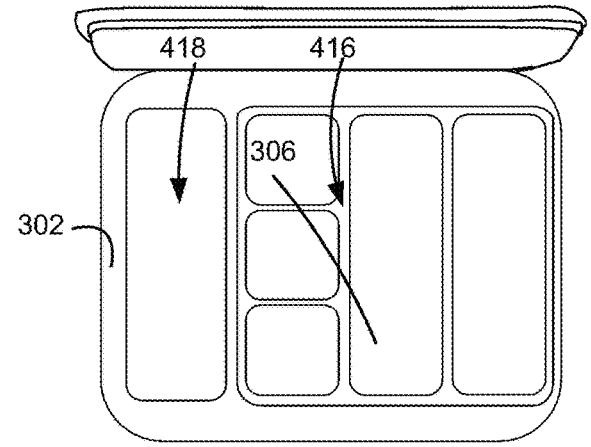
FIG. 8D is an example fourth arrangement of sub-containers in the bottom compartment of a secure storage container.

Referring next to FIGS. 8A-8C, there are shown multiple configurations of the sub-containers 306. As discussed above, the sub-containers 306 may have a plurality of sizes sized according to m by n base portions, where m is the width and n is the height in integer numbers of base portions. The sub-containers 306 for a secure storage container with 4×4 base portions of the base surface 402 may include a 1×1 sub-container, a 1×2 sub-container, a 1×3 sub-container, a 1×4 sub-container, a 2×2 sub-container, a 2×3 sub-container, a 3×3 sub-container, a 3×4 sub-container, and a 4×4 sub-container. As indicated above, the base surface may have any size with an m×n integer array of base portions disposed thereupon, and the sub-containers may be sized up to and including m integer portions by n integer portions.

The m×n sizing of the sub-container may be said to cover a sub-container base portion, where the sub-container base portion corresponds to the base portions in the one or more base portions substantially covered by the m×n sub-container. For example, a 2×2 sub-container may be said to cover a sub-container base portion sized 2 base portions wide and 2 base portions high.

Figure 9A:
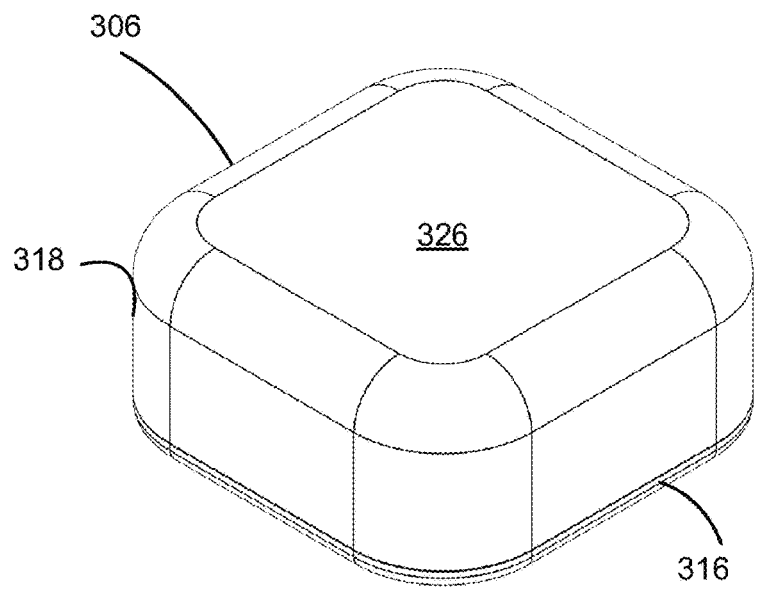
FIG. 9A is a perspective view for a sub-container.
Figure 9B:
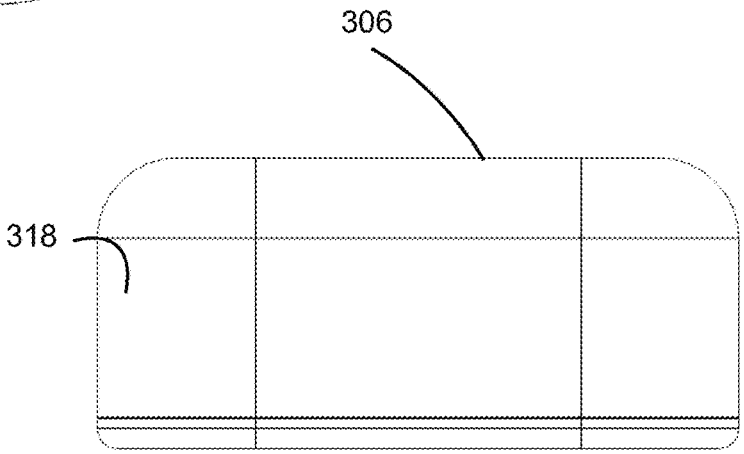
FIG. 9B is a front view for a sub-container.
Figure 9C:
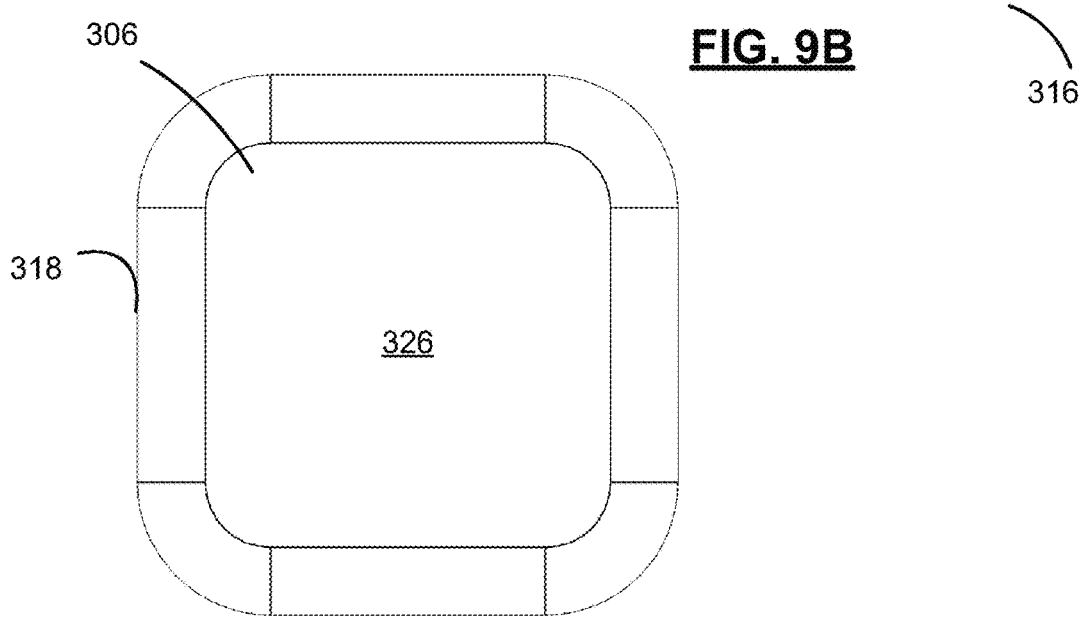
FIG. 9C is a top view for a sub-container.

Referring next to FIGS. 9A-9C, there is shown an example sub-container 306. Each of the one or more sub-containers 306 comprises a sub-container base 316 and at least one sub-container wall 318 extending from the sub-container base 316. The sub-container base 316 may rest upon the base surface 402, and may be sized to substantially cover one or more base portions 412 of the base surface 402 (see e.g. FIG. 4E).

In a further embodiment, each sub-container 306 may include an NFC identifier, an RFID identifier, and a barcode identifier. The NFC identifier of the sub-container 306 may be read by a NFC sensor inside the main cavity of the secure storage container to identify the sub-container as previously described. The RFID identifier of the sub-container 306 may be read by an RFID sensor inside the main cavity of the secure storage container to identify the sub-container as previously described. The barcode identifier of the sub-container 306 may be read by a camera sensor inside the main cavity of the secure storage container to identify the sub-container as previously described.

Each sub-container may have a top 326 that re-sealable connects to the one or more sub-container walls 318. The top 326 may be a snap-top, a screw-top, an interference fit, or another container seal as is known. Each sub-container holds one or more products in a sub-container cavity defined by the sub-container base 316, the one or more sub-container walls 318, and the sub-container top 326.

In a further embodiment, the sub-containers 306 may have rounded corners between each of the one or more sub-container walls 318, between the one or more walls 318 and the top 326, and between the one or more walls 318 and the base 316.

Figure 10:
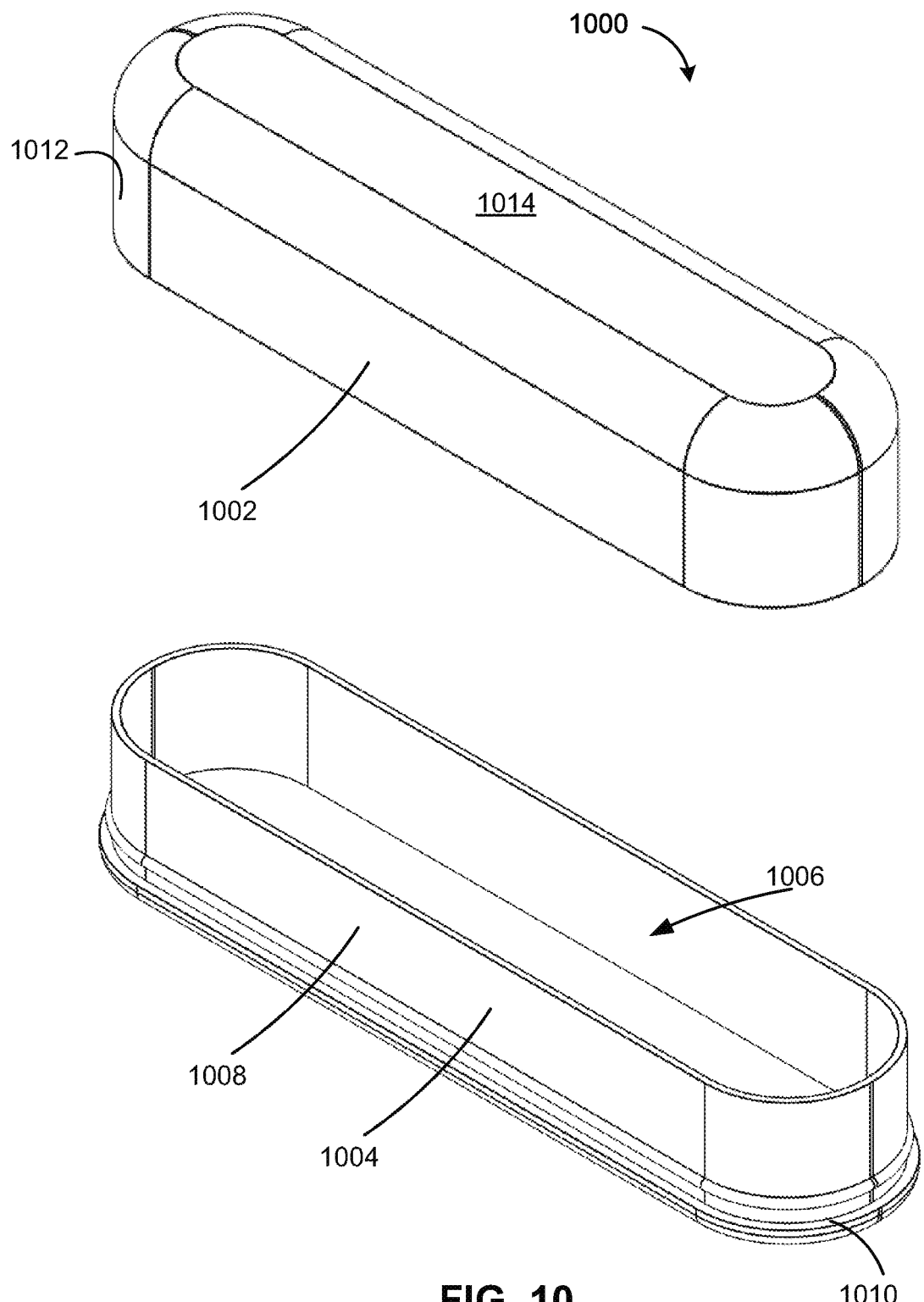
FIG. 10 is an exploded view of a sub-container.

Referring next to FIG. 10, there is shown an exploded view 1000 of a sub-container. The sub-container may have a top portion 1002 and a bottom portion 1004. The top portion 1002 may have a top 1014, and one or more walls 1012 extending from the top 1014. The bottom portion 1004 may have a sub-container base 1010, one or more walls 1008 extending from the sub-container base 1010, and a sub-container cavity 1006 defined by the sub-container base 1010 and the one or more walls 1008. The bottom portion 1004 and the top portion 1002 may be releasably connected with an interference fit, and may provide a substantially airtight fit. A product may be stored in the sub-container cavity 1006.

Figure 11B:
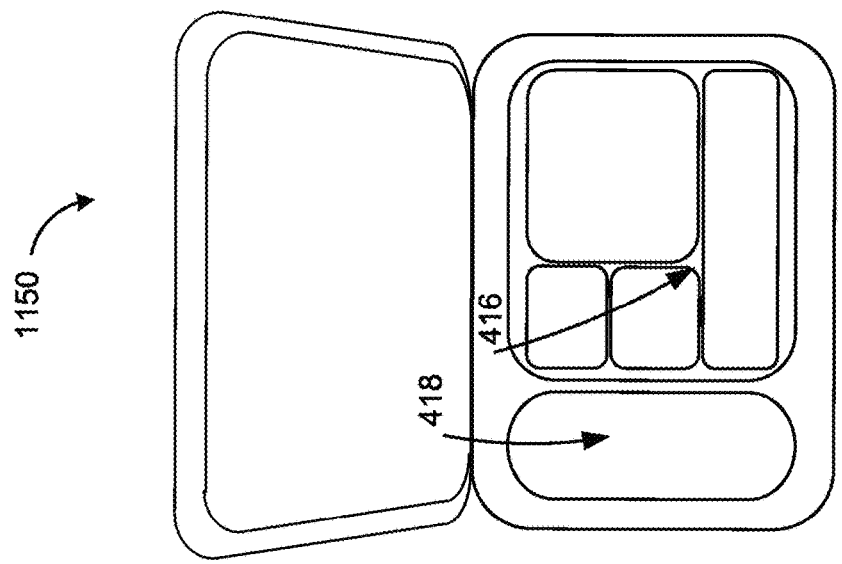
FIG. 11B is a top view of an open secure storage container housing sub-containers which are filled with products.
Figure 11A:
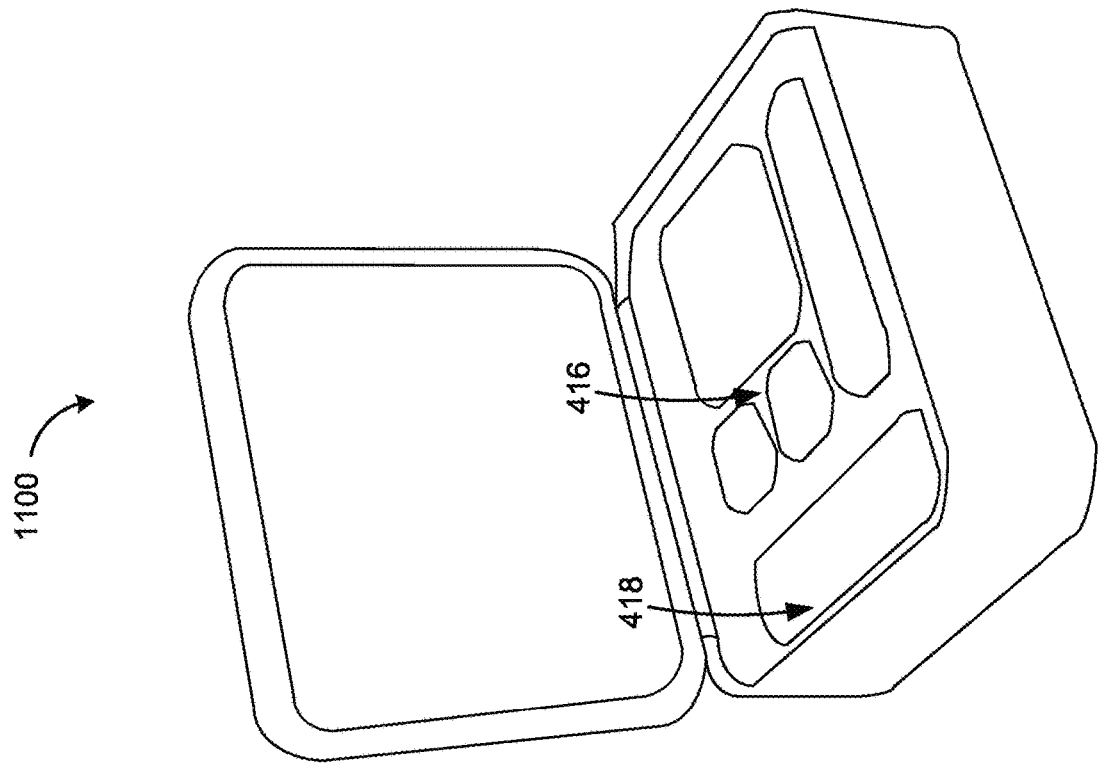
FIG. 11A is a perspective view of an open secure storage container housing sub-containers which are filled with products.

Reference is next made to FIG. 11A-11B, which show photos of a secure storage container having one or more products stored in sub-containers inside the main cavity 416. Auxiliary cavity 418 includes one or more items related to the one or more products stored inside the sub-containers in the main cavity 416.

Reference is next made to FIG. 12, which shows a perspective view 1200 of an alternate embodiment of the open secure storage container with a cylindrical shape. In FIG. 12, one wall 1204 is shown extending from a circular base 1202. In this embodiment, the one or more base portions and the one or more sub-containers 1206 may also be circular. A hinge 1208 may be provided between the wall 1204 and the top 1212. A re-sealable interface 1210 may provide a substantially airtight connection between the top 1212 and the base 1202 when in a locked position.

Figure 13A:
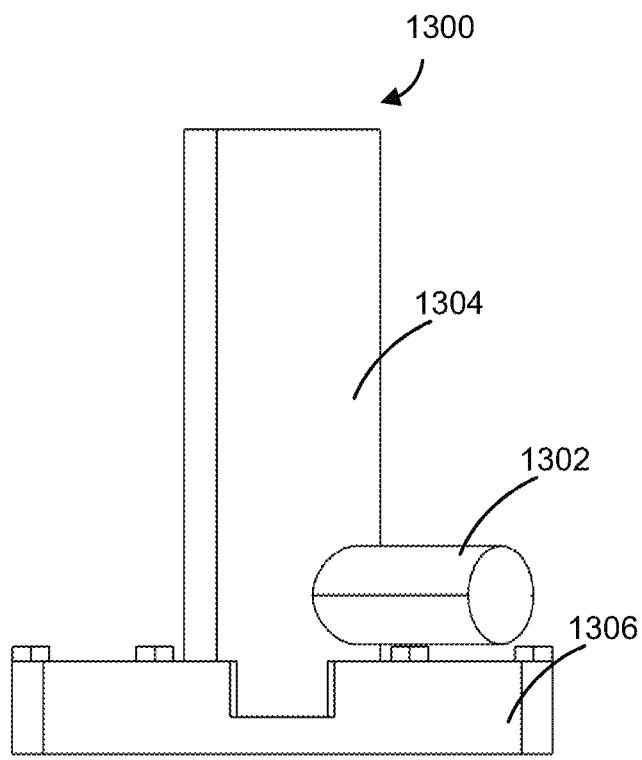
FIG. 13A is a front view of an electronic lock.
Figure 13B:
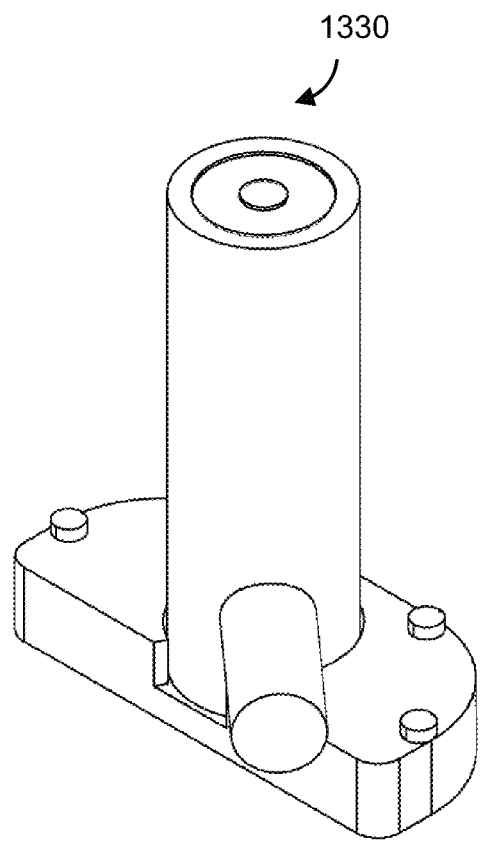
FIG. 13B is a perspective view of an electronic lock.
Figure 13C:
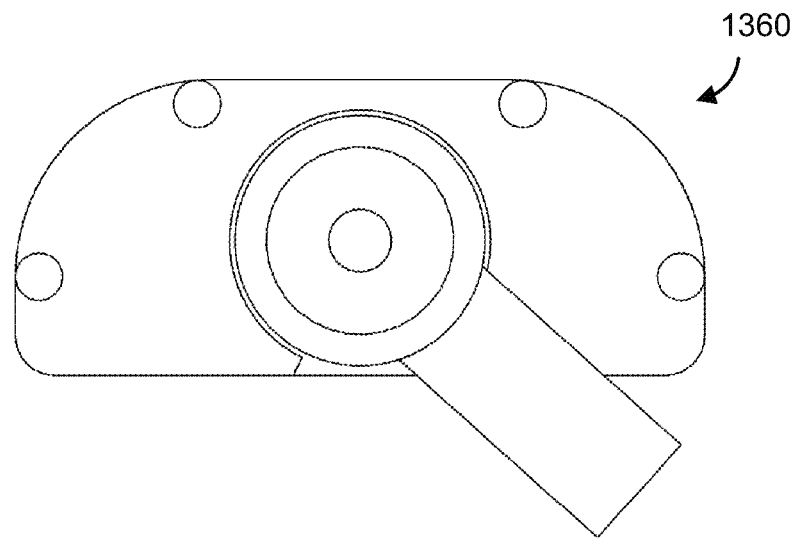
FIG. 13C is a top view of an electronic lock.

Referring next to FIGS. 13A-13C, an example of an electronic lock is shown. The electronic lock 1300 may be a magnetic lock, including an electromagnet disposed on the base of the secure storage container and a ferromagnetic portion of the top of the secure storage container to provide securement. In an alternate embodiment, the electromagnetic lock may have a permanent magnet and an electromagnet, and the activation of the electromagnet may counteract the magnetic field of the permanent magnet in order to unlock the top from the one or more walls. This embodiment may provide securement in the absence of electrical power to the secure storage container. In an alternate embodiment such as the one shown in FIG. 13A-13C, the electronic lock may be a motorized mechanical lock that may turn inside a locking aperture on the top in order to provide mechanical locking of the secure storage container. The electronic lock 1300 may be attached on the one or more walls of the secure storage container, or the divider. The electronic lock 1300 ensures that only an authorized user can unlock the secure storage container to access the products inside. To unlock the secure storage container, the mobile application at the mobile device must authenticate the user, present the user with a user interface for unlocking, receive a user unlocking request, and then transmit an unlocking message from a local wireless transceiver or communication unit of the mobile device to a local wireless transceiver or communication unit of the secure storage container, and the secure storage container may activate the locking mechanism 1300 from a locked to an unlocked position. To lock the secure storage container, a similar corresponding action must be taken with a lock message sent to the secure storage container, and the secure storage container activating the locking mechanism from an unlocked to a locked position . The user may be required to authenticate themselves using a password, pin, or biometric method. The biometric authentication may include, but is not limited to, facial recognition, fingerprint recognition, iris scan recognition, blood vessel recognition, or voice recognition. If the authentication is successful, the mobile application provides the unlock message to the secure storage container. In the mechanical locking embodiment, the lock base 1306 is attached to the container base, the lock base comprising an electro-mechanical mechanism for rotating the upright 1304 along its axis to position the lock radial member 1302 in a locking interference position inside a lock aperture on the top of the secure storage container. The top of the secure storage container may have a complimentary aperture to the mechanical lock 1300, where the upright 1304 and radial member 1302 may fit through, and then lock by rotating the upright member 1304 around an axis so the radial member 1302 is no longer aligned with the complimentary aperture.

Figure 13D:
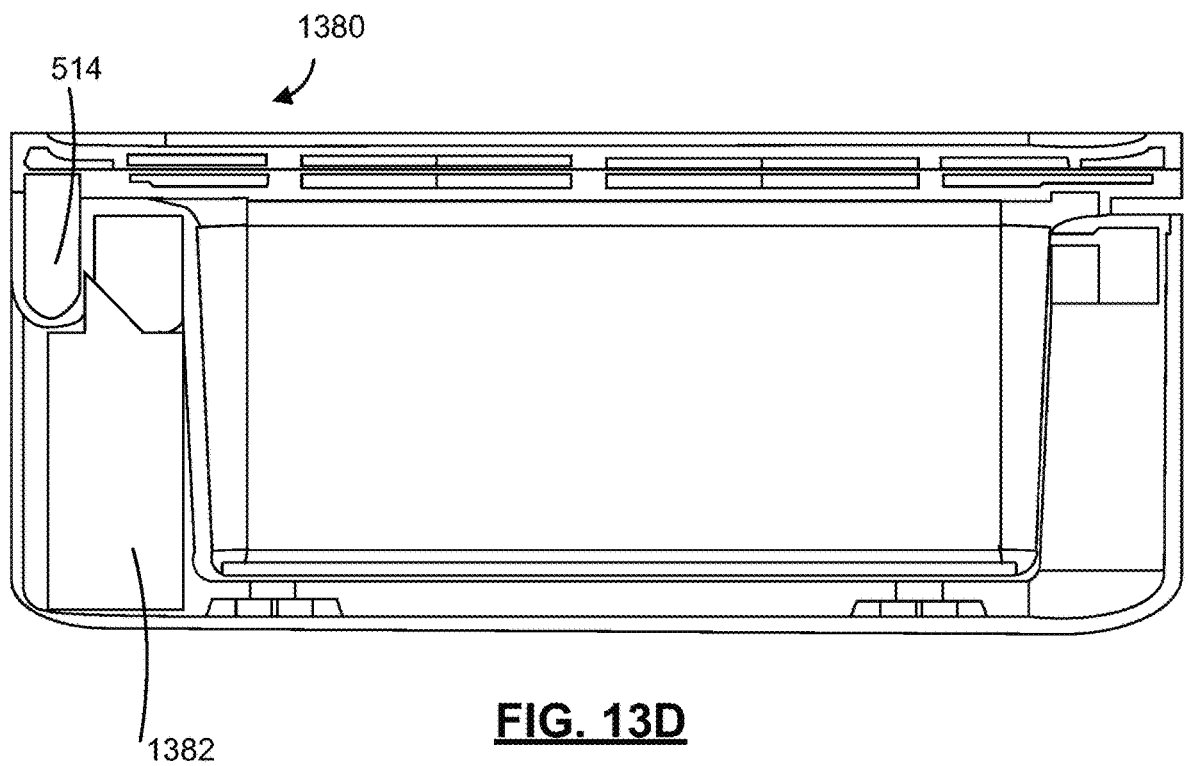
FIG. 13D is a cross sectional view of an alternate electronic lock for the alternate hinge in FIGS. 5E, 5F and 5G.

Referring next to FIG. 13D, a cross-sectional diagram 1380 showing an example of an alternate electronic lock for the alternate hinge in FIGS. 5E, 5F and 5G is shown. The electronic lock 1382 may have a solenoid which extends into a female mating feature in the alternate lid hinge 514 (see e.g. FIGS. 5E, 5F, and 5G). When the solenoid is activated by an "open box" command received by the container, the electronic lock 1382 retracts from the alternate lid hinge 514 and the spring-loaded lid opens. The user may manually close the lid. As the user closes the lid into the closed position, the lid reaches a point where the spring-loaded solenoid can extend back into (snap back into) its receiving feature, thereby providing securement. This embodiment may provide securement in the absence of electrical power to the secure storage container. The electronic lock 1382 ensures that only an authorized user can unlock the secure storage container to access the products inside. To unlock the secure storage container, the mobile application at the mobile device must authenticate the user, present the user with a user interface for unlocking, receive a user unlocking request, and then transmit an unlocking message from a local wireless transceiver or communication unit of the mobile device to a local wireless transceiver or communication unit of the secure storage container, and the secure storage container may activate the locking mechanism 1382 from a locked to an unlocked position.

Figure 14A:
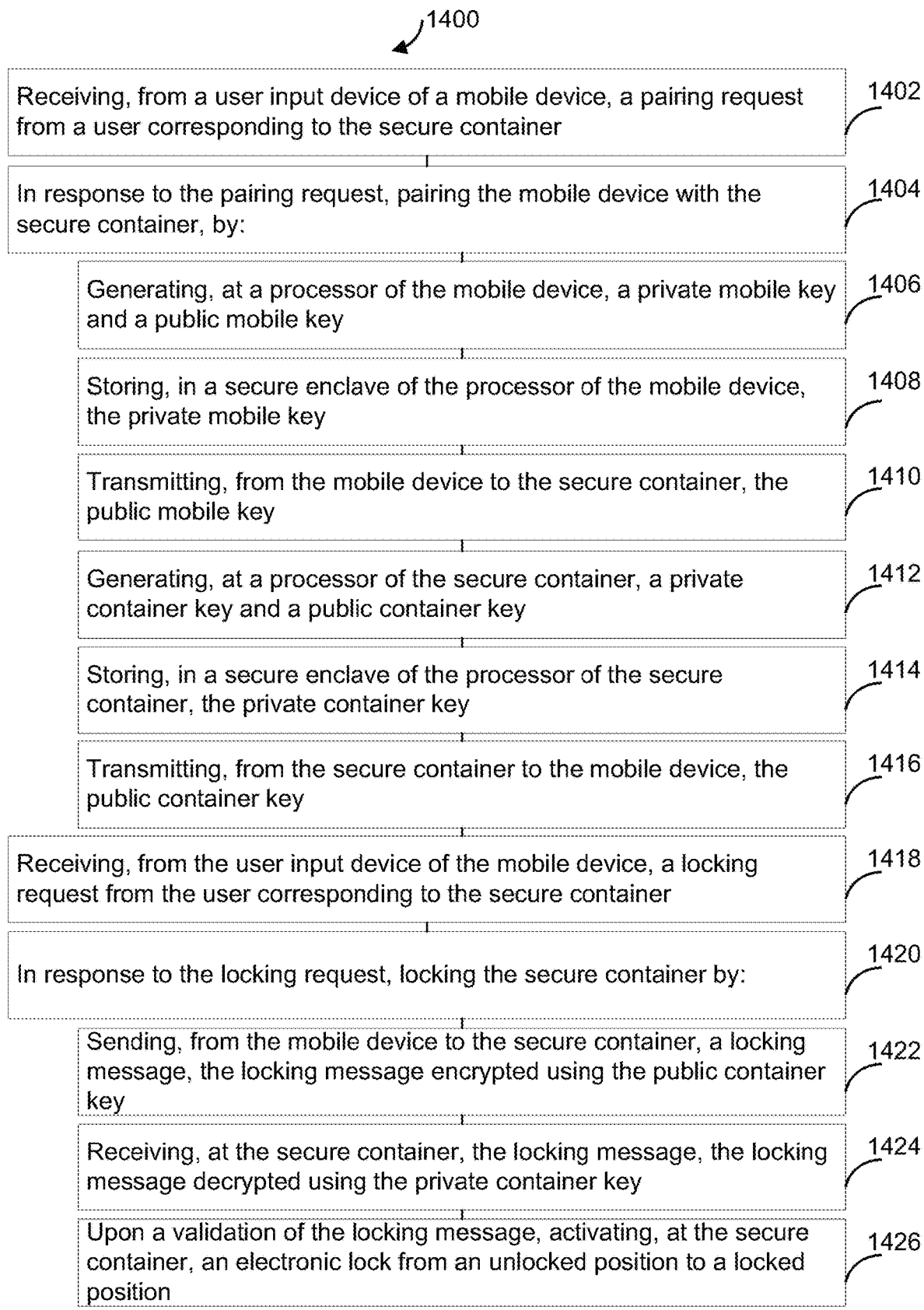
FIG. 14A is a method of using a secure storage container.

Reference is next made to FIG. 14A, a method diagram 1400 of using a secure storage container is shown.

At 1402, receiving, from a user input device of a mobile device, a pairing request from a user corresponding to the secure storage container.

At 1404, in response to the pairing request, pairing the mobile device with the secure storage container, by:

At 1406, generating, at a processor of the mobile device, a private mobile key and a public mobile key.

At 1408, storing, in a secure enclave of the processor of the mobile device, the private mobile key.

At 1410, transmitting, from the mobile device to the secure storage container, the public mobile key.

At 1412, generating, at a processor of the secure storage container, a private container key and a public container key.

At 1414, storing, in a secure enclave of the processor of the secure storage container, the private container key.

At 1416, transmitting, from the secure storage container to the mobile device, the public container key.

At 1418, receiving, from the user input device of the mobile device, a locking request from the user corresponding to the secure storage container.

At 1420, in response to the locking request, locking the secure storage container by:

At 1422, sending, from the mobile device to the secure storage container, a locking message, the locking message encrypted using the public container key.

At 1424, receiving, at the secure storage container, the locking message, the locking message decrypted using the private container key.

At 1426, upon a validation of the locking message, activating, at the secure storage container, an electronic lock from an unlocked position to a locked position.

Figure 14B:
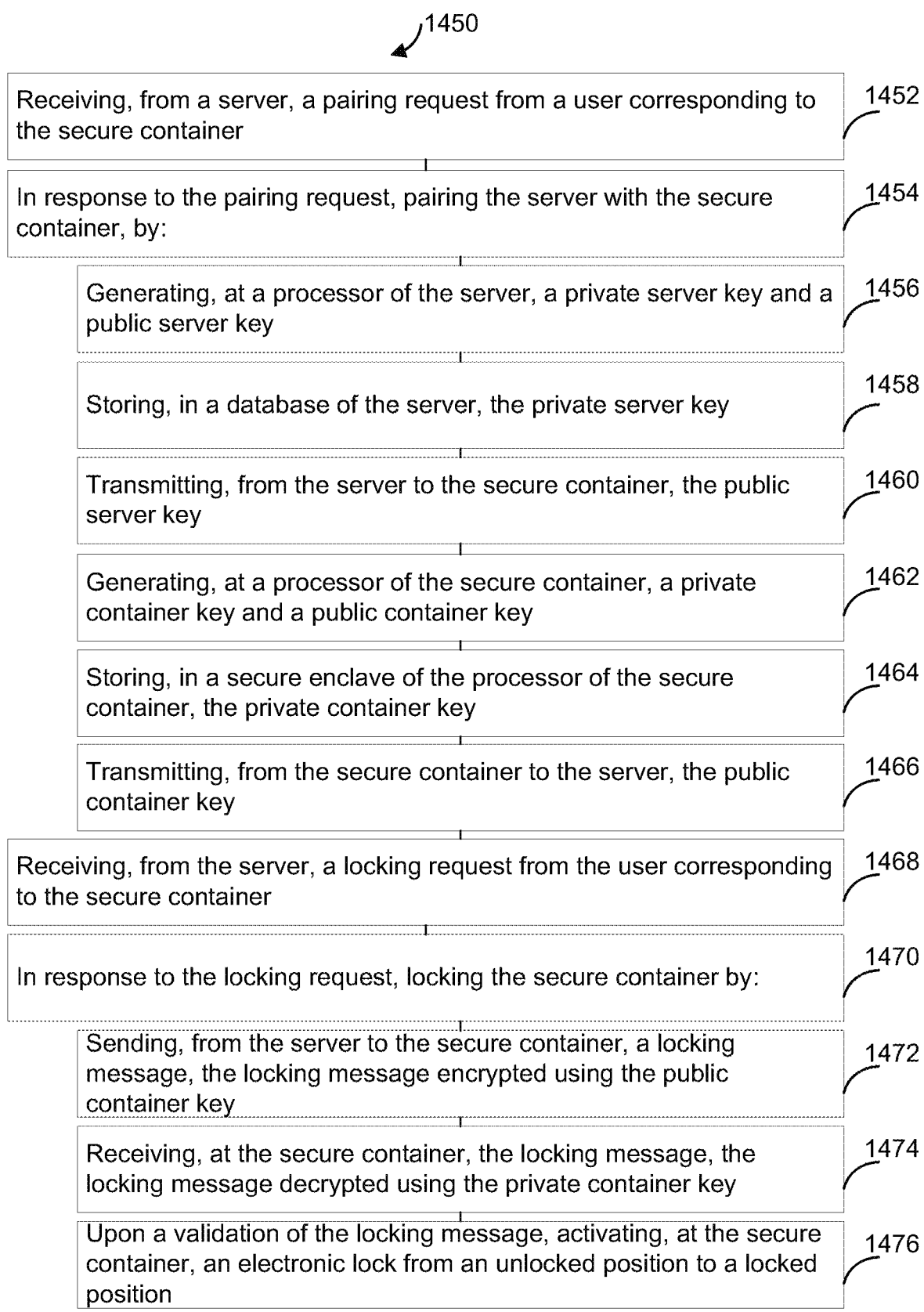
FIG. 14B is another method of using a secure storage container.

Reference is next made to FIG. 14B, showing another method diagram 1450 of using a secure storage container.

At 1452, receiving, from a server, a pairing request from a user corresponding to the secure storage container.

At 1454, in response to the pairing request, pairing the server with the secure storage container, by:

At 1456, generating, at a processor of the server, a private server key and a public server key.

At 1458, storing, in a database of the server, the private server key.

At 1460, transmitting, from the server to the secure storage container, the public server key.

At 1462, generating, at a processor of the secure storage container, a private container key and a public container key.

At 1464, storing, in a secure enclave of the processor of the secure storage container, the private container key.

At 1466, transmitting, from the secure storage container to the server, the public container key.

At 1468, receiving, from the server, a locking request from the user corresponding to the secure storage container.

At 1470, in response to the locking request, locking the secure storage container by:

At 1472, sending, from the server to the secure storage container, a locking message, the locking message encrypted using the public container key.

At 1474, receiving, at the secure storage container, the locking message, the locking message decrypted using the private container key.

At 1476, upon a validation of the locking message, activating, at the secure storage container, an electronic lock from an unlocked position to a locked position.

Referring next to FIG. 15A, there is shown a mobile application user interface 1500 for unlocking a secure storage container. The user interface 1500 includes an unlock button 1502, a visualization of the locked secure storage container 1504, and one or more sensor data values 1506. Once authenticated, a user may click or press the unlock button 1502 to unlock the secure storage container as described herein. The visualization of the secure storage container 1504 may represent the unlocked or locked position of the secure storage container at the present time. The one or more sensor data values 1506 may be displayed based upon the sensor data transmitted from the secure storage container to the mobile application. A user pressing the widget associated with a particular sensor data value 1506 may view a historical summary of the particular sensor data value 1506.

Referring next to FIG. 15B, there is shown a mobile application user interface 1520 for locking a secure storage container. The user interface 1520 includes an lock button 1522, and a visualization of the unlocked secure storage container 1524. Once authenticated, a user may click or press the lock button 1522 to unlock the secure storage container as described herein. The visualization of the secure storage container 1524 may represent the unlocked or locked position of the secure storage container at the present time.

Referring next to FIG. 15C, there is shown a mobile application user interface 1540 showing the secure storage container inventory. The user interface 1540 includes an a visualization of the secure storage container inventory 1542, and a calibration button 1544. Once authenticated, a user may click or press the inventory visualization 1542 to view individual inventory levels of one or more sub-containers within the secure storage container. The calibration button 1544 may allow a user to "tare" or zero the one or more weight sensors within the secure storage container, or follow other calibration instructions for the one or more weight sensors.

Referring next to FIG. 15D, there is shown a mobile application user interface 1560 showing a notification history of the secure storage container. The notification history may include a timeline 1562 such as the one shown, and may include notifications including access times for users locking and unlocking the secure storage container, notifications for unauthorized access attempts, notifications for attempts to move the secure storage container from one location to another, notifications for temperature conditions, notifications for humidity conditions, etc.

Referring next to FIG. 15E, there is shown an alternate mobile application user interface 1570 showing a notification history of the secure storage container. The notification history may include a timeline 1572 such as the one shown, and may include notifications including access times for users locking and unlocking the secure storage container, notifications for unauthorized access attempts, notifications for attempts to move the secure storage container from one location to another, notifications for temperature conditions, notifications for humidity conditions, etc.

Referring next to FIG. 16, there is shown a user interface 1600 for configuring various secure storage container notifications at a mobile application paired with the secure storage container. The notification configuration may include notification options for locking and unlocking 1602, notification options for security warnings 1604, notification options for access controls 1606, notification options for temperature monitoring 1608, notification options for humidity monitoring 1610, and notification options for power 1612.

Referring next to FIG. 17, there is shown a user interface 1700 throughout the pairing of the secure storage container to a mobile application on a mobile device. A user initiates pairing by launching the mobile application and views initial pairing interface 1702. The user is prompted in the user interface of step two 1704 to scan a Quick Response (QR) code, or otherwise uniquely identify the secure storage container that is being used for pairing. If the user succeeds in pairing the mobile application and the secure storage container, they will receive the third user interface 1706. If the user is attempting to pair a secure storage container that is already paired with another mobile application, the user receives an error message in the fourth user interface 1708.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

We claim:

1. A secure storage system, the system comprising:
a secure storage container, the secure storage container comprising:
a base;
at least one wall extending from the base defining a storage cavity;
a top, the top configured to cooperate with the at least one wall to provide a re-sealable closure for the storage cavity;
an electronic lock the electronic lock having an unlocked position and a locked position, the locked position providing a substantially tamper resistant securement of the top to the at least one wall;
a first wireless transceiver;
a processor, the processor in communication with the first wireless transceiver and the electronic lock, the processor generally configured to:
receive, using the first wireless transceiver, a locking message; and
activating the electronic lock from the unlocked position to the locked position in response to the locking message;
a mobile application executed on a mobile processor of a mobile device, the mobile application generally configured to:
receive a first user input;
transmit, from a second wireless transceiver of the mobile device to the first wireless transceiver, the locking message based on the first user input;
the secure storage container further comprising:
the base further comprises a weight sensor, the weight sensor in communication with the processor of the secure storage container;
the processor further configured to:
transmit, from the first wireless transceiver to the second wireless transceiver, weight data from the weight sensor; and
the mobile application further configured to receive, using the second wireless transceiver of the mobile device, the weight data from the weight sensor;
the processor of the secure storage container is further configured to:
determine a weight change over a time period based on the weight data; and
transmit a dosage message corresponding to the weight change to the mobile device;
the mobile application is further configured to:
receive the dosage message from the secure storage container; and
display a dosage notification based on the dosage message to a user at the mobile device.

2. The secure storage system of claim 1, wherein:
the processor of the secure storage container is further configured to:
receive, using the first wireless transceiver, an unlocking message; and
activating the electronic lock from the locked position to the unlocked position in response to the unlocking message;
the mobile application generally configured to:
receive a second user input;
transmit, from the second wireless transceiver of the mobile device to the first wireless transceiver, the unlocking message based on the second user input.

3. The secure storage system of claim 2, wherein the mobile application is further configured to receive an unauthorized access message from the secure storage container based on an unlock attempt to open the secure storage container when the electronic lock is in the locked position or a move attempt to move the secure storage container when the electronic lock is in the locked position, and deliver an unauthorized access notification corresponding to the unauthorized access message to a user.

4. The secure storage system of claim 2, further comprising:
a server, the server comprising:
a server processor, the server processor configured to:
receive an unauthorized access message from the secure storage container based on an attempt to open the secure storage container when the electronic lock is in the locked position or an attempt to move the secure storage container when the electronic lock is in the locked position; and
transmit an unauthorized access notification corresponding to the unauthorized access message to a user at the mobile device.

5. The secure storage system of claim 2, wherein there is a single base portion comprising substantially the entire base.

6. The secure storage system of claim 2, further comprising:
the secure storage container further comprising:
the base comprising a regularly spaced grid arrangement of one or more base portions, each base portion comprising a weight sensor;
the processor further configured to:
transmit, from the first wireless transceiver to the second wireless transceiver, weight data from the weight sensor of each of the one or more base portions; and
the mobile application further configured to receive, using the second wireless transceiver of the mobile device, the weight data from each of the one or more base portions.

7. The secure storage system of claim 2, further comprising:
one or more sub-containers, each of the one or more sub-containers comprising:
a sub-container base;
at least one sub-container wall extending from the sub-container base;
the sub-container base sized to substantially cover one or more base portions in a regularly spaced arrangement of base portions.

8. The secure storage system of claim 3, wherein the electronic lock is disposed on a hinge connecting the top and the at least one wall.

9. The secure storage system of claim 8, wherein the unlock attempt is detected by one or more hinge sensors integrated with the hinge.

10. The secure storage system of claim 6, wherein the mobile application is further configured to deliver a weight notification to a user based on the weight data or change in weight over a time period.

11. The secure storage system of claim 10, wherein the mobile application stores a secure storage container public key and the processor of the secure storage container stores a mobile application public key, and the processor of the mobile device and the processor of the secure storage container encrypt their communications using public-key cryptography.

12. The secure storage system of claim 11, wherein a secure storage container private key is stored in a secure enclave of the processor of the secure storage container, and a mobile application private key is stored in a secure enclave of the processor of the mobile device.

13. The secure storage system of claim 12, wherein the mobile application authenticates a user identity using a user biometric.

14. The secure storage system of claim 12, wherein the mobile application is further configured to send an access control message to a second user at a second mobile device.

15. The secure storage system of claim 13, further comprising:
a biometric device in communication with the mobile device, the biometric device configured to perform one or more of facial recognition, fingerprint recognition, iris scan recognition, blood vessel recognition, or voice recognition to determine the user biometric.

16. The secure storage system of claim 7, further comprising:
the secure storage container further comprising:
a local wireless transceiver;
the one or more sub-containers, each further comprising a local wireless identifier, wherein the local wireless identifier is readable by the local wireless transceiver.

17. The secure storage system of claim 7, wherein:
the secure storage container further comprises:
one or more identification sensors configured to identify the one or more sub-containers; and
each of the one or more sub-containers further comprises:
an identifier that is readable by the one or more identification sensors.

18. The secure storage system of claim 7, wherein an exterior of the one or more sub-containers further comprises a grip.

* * * * *